United States Patent
El Kaed et al.

(10) Patent No.: US 11,630,866 B2
(45) Date of Patent: Apr. 18, 2023

(54) SEMANTIC SEARCH AND RULE METHODS FOR A DISTRIBUTED DATA SYSTEM

(71) Applicant: SCHNEIDER ELECTRIC USA, INC., Andover, MA (US)

(72) Inventors: Charbel Joseph El Kaed, Boston, MA (US); Andre van den Berg, Pretoria (ZA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 290 days.

(21) Appl. No.: 16/345,443

(22) PCT Filed: Oct. 30, 2017

(86) PCT No.: PCT/US2017/059055
§ 371 (c)(1),
(2) Date: Apr. 26, 2019

(87) PCT Pub. No.: WO2018/081717
PCT Pub. Date: May 3, 2018

(65) Prior Publication Data
US 2019/0278809 A1    Sep. 12, 2019

Related U.S. Application Data

(60) Provisional application No. 62/415,330, filed on Oct. 31, 2016.

(51) Int. Cl.
*G06F 16/9032* (2019.01)
*G06F 16/36* (2019.01)
*G06F 16/903* (2019.01)
(Continued)

(52) U.S. Cl.
CPC .. *G06F 16/90332* (2019.01); *G06F 16/24568* (2019.01); *G06F 16/27* (2019.01);
(Continued)

(58) Field of Classification Search
CPC ......... G06F 16/90332; G06F 16/90335; G06F 16/367; G06F 30/40
See application file for complete search history.

(56) References Cited

U.S. PATENT DOCUMENTS 6,263,342 B1 * 7/2001 Chang ................. G06F 16/2452
8,260,842 B1 * 9/2012 Zaretzky ............ H04N 21/4424
709/202
(Continued)

FOREIGN PATENT DOCUMENTS

| WO | 2015003063 A1 | 1/2015 |
| WO | 2015164359 A1 | 10/2015 |
| WO | 2017173104 A1 | 10/2017 |

OTHER PUBLICATIONS

Anonymous: "AWS IoT Developer Guide", Sep. 30, 2015 (Sep. 30, 2015), XP055441481, Retrieved from the Internet: URL:https://raw.githubusercontent.com/SeeedDocument/Beagle_Bone_Green_and_Grove_IoT_Starter_Kit_Powered_by_AWS/master/res/AWS_IoT_Developer_Guide.pdf [retrieved on Jan. 16, 2018].
(Continued)

*Primary Examiner* — Mohamed Abou El Seoud
*Assistant Examiner* — J Mitchell Curran
(74) *Attorney, Agent, or Firm* — Lando & Anastasi, LLP

(57) ABSTRACT

Methods and systems are provided for searching and/or acting on information in a distributed data processing system. A method of processing a semantic rules engine may comprise receiving a rule data set, identifying a set of connected elements based on the rule data set, evaluating conditions related to the set of connected elements and the rule data set, determining a command set based on the evaluated conditions of the set of connected elements, and executing the command set.

25 Claims, 19 Drawing Sheets

(51) Int. Cl.
  *G06F 40/30* (2020.01)
  *G06F 16/951* (2019.01)
  *G06F 16/2455* (2019.01)
  *G06F 16/27* (2019.01)
(52) U.S. Cl.
  CPC ...... *G06F 16/367* (2019.01); *G06F 16/90335* (2019.01); *G06F 16/951* (2019.01); *G06F 40/30* (2020.01)

(56) References Cited

U.S. PATENT DOCUMENTS

| | | | |
|---|---|---|---|
| 8,442,917 B1 * | 5/2013 | Burke | G06Q 50/06 705/63 |
| 9,483,735 B2 | 11/2016 | Chen et al. | |
| 2002/0095322 A1 * | 7/2002 | Zarefoss | G06Q 10/06 717/100 |
| 2005/0289124 A1 | 12/2005 | Kaiser et al. | |
| 2006/0248058 A1 * | 11/2006 | Feng | G06F 16/258 |
| 2010/0153088 A1 * | 6/2010 | Kim | G06F 8/65 703/22 |
| 2011/0077758 A1 | 3/2011 | Tran et al. | |
| 2011/0196852 A1 | 8/2011 | Srikanth et al. | |
| 2011/0218842 A1 * | 9/2011 | Addala | G06Q 10/06393 706/59 |
| 2012/0197911 A1 | 8/2012 | Banka et al. | |
| 2012/0290230 A1 | 11/2012 | Berges Gonzalez et al. | |
| 2012/0310417 A1 | 12/2012 | Enohara et al. | |
| 2013/0311146 A1 * | 11/2013 | Miller | H04W 16/18 703/1 |
| 2013/0332411 A1 * | 12/2013 | Nguyen | G06Q 10/06 707/609 |
| 2014/0108019 A1 | 4/2014 | Ehsani et al. | |
| 2014/0316743 A1 | 10/2014 | Drees et al. | |
| 2015/0134585 A1 | 5/2015 | Chen et al. | |
| 2015/0286969 A1 | 10/2015 | Warner et al. | |
| 2015/0293764 A1 * | 10/2015 | Visvanathan | G06F 8/36 717/102 |
| 2015/0339346 A1 | 11/2015 | Berchtold et al. | |
| 2016/0350364 A1 * | 12/2016 | Anicic | G06F 8/35 |
| 2017/0284691 A1 | 10/2017 | Sinha et al. | |
| 2018/0232422 A1 | 8/2018 | Park et al. | |
| 2018/0341255 A1 | 11/2018 | Turney et al. | |
| 2018/0373753 A1 * | 12/2018 | Flaks | G06F 16/245 |
| 2020/0082037 A1 | 3/2020 | Zhang et al. | |

OTHER PUBLICATIONS

Gyrard Amelie et al : "A Semantic Engine for Internet of Thi ngs: Cl oud, Mobile Devices and Gateways", 2015 9th International Conference on Innovati ve Mobile and Internet Services in Ubiquitous Computing, IEEE, Jul. 8, 2015 (Jul. 8, 2015), pp. 336-341, XP033221515, DOI: 10.1109/IMIS.2015.83 [retrieved on Sep. 30, 2015].

Martin Bauer et al: "Semantic Interoperability for the Web of Things", , Aug. 27, 2016 (Aug. 27, 2016), XP055441479, DOI: 10.13140/RG.2.2 .25758.13122 Retrieved from the Internet: URL:https:// www.researchgate.n <itlp://www.researchgate.net/profile/Paul>et/ profile/Paul <http://www.researchgate.net/profile/Paul>_Murdock/ publication/307122744_Semantic_Interoperability_for_the_Web_ of_Things/links/57c1df6008aeda1 ec38cf5f5/Semantic -Interop erability-for-the-Web-of- Things.pdf [retrieved on Jan. 16, 2018].

Notification of Transmittal of the International Search Report and the Written Opinion of the International Searching Authority from corresponding PCT/US2017/059055 dated Jan. 25, 2018.

Richard Mietz et al: "Semantic Models for Scalable Search in the Internet of Things", Journal of Sensor and Actuator Networks, vol. 2, No. 2, Mar. 27, 2013 (Mar. 27, 2013), pp. 172-195, XP055441482, DOI: 10.3390/jsan2020172.

Datta Soumya Kant et al: "oneM2M Architecture Based User Centric IoT Application Development", 2015 3rd International Conference on Future Internet of Things and Cloud, IEEE, Aug. 24, 2015 (Aug. 24, 2015), pp. 100-107, XP032798274, DOI: 10.1109/ FICLOUD.2015.7 [retrieved on Oct. 19, 2015].

Henson, C. et al. "An Ontological Representation ofTime Series Observations on the Semantic Sensor Web." (2009). (Year: 2009).

Hyun Lyunsik et al: "A System for the Specification and Execution of Conditional WoT Applications over Voice", Proceedings of the Posters and Demos Session of the 16th International Middleware Conference on, Middleware Posters and Demos '15, Dec. 7, 2015 (Dec. 7, 2015), pp. 1-2, XP055774292, New York, New York, USA, DOI: 10.1145/2830894.2830895, ISBN: 978-1-1503-3729-8, Retrieved from the Internet: URL:https://dl.acm.org/doi/pdf/10.1145/2830894. 2830895.

Li Hongkun et al : "Enabling Semantics in an M2M/IoT Serviice Delivery Platform", 2016 IEEE Tenth International Conference on Semantic Computing (ICSC), IEEE, Feb. 4, 2016 (Feb. 4, 2016), pp. 206-213, XP032886254, DOI: 10.1109/ICSC.2016.28 [retrieved on Mar. 22, 2016].

Lucelia de Souza et al., "Domain Ontology for Time Series Provenance." (2014). (Year: 2014).

Miccauley Robert: "Using Alexa Skills Kit and AWS IoT to Voice Control Connected Devices", May 3, 2016 (May 3, 2016), XP055776265, [retrieved on Feb. 15, 2021].

Young-Guk Ha et al: "Automated Teleoperation of Web-Based Devices Using Semantic Web Services", Jun. 22, 2005 (Jun. 22, 2005), Innovations in Appli ed Artificial Intelligence; [Lecture Notes in Computer Science; Lecture Notes in Artificial Intelligence; LNCS ], Springer-Verlag, Berlin/Heidelberg, pp. 185-188, XP019011498, ISBN: 978-3-540-26551-1.

* cited by examiner

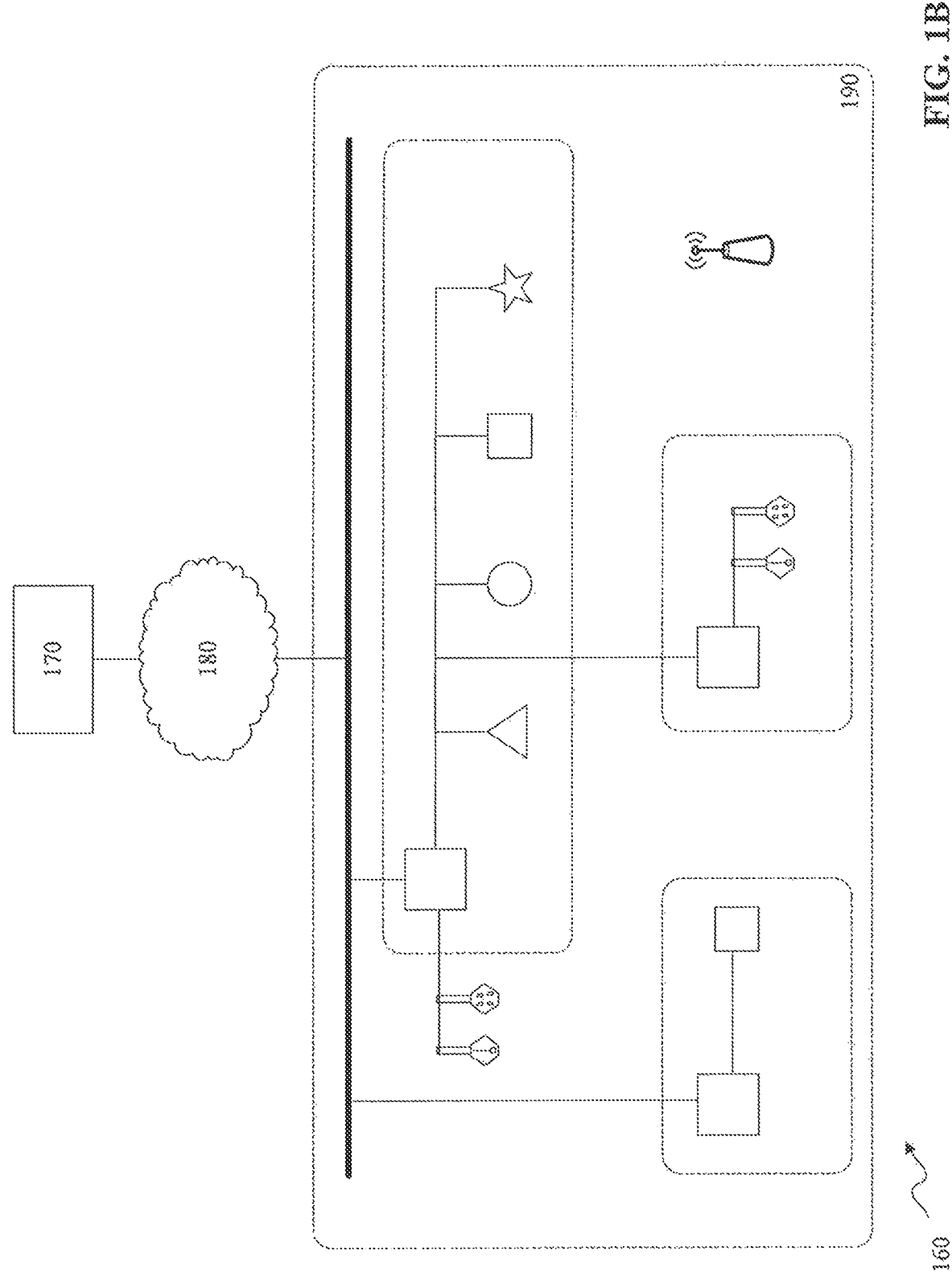

SEMANTIC SEARCH AND RULE METHODS FOR A DISTRIBUTED DATA SYSTEM

RELATED APPLICATIONS

This application is a U.S. National Stage Application under 35 U.S.C. § 371 of International Application No. PCT/US2017/059055, filed Oct. 30, 2017, titled SEMANTIC SEARCH AND RULE METHODS FOR A DISTRIBUTED DATA SYSTEM, which claims the benefit under 35 U.S.C. § 119(e) of U.S. Provisional Application No. 62/415,330, filed Oct. 31, 2016, titled SEMANTIC SEARCH AND RULE METHODS FOR A DISTRIBUTED DATA SYSTEM, both of which are hereby incorporated by reference in their entirety for all purposes.

FIELD OF THE INVENTION

Embodiments of the present disclosure relate generally to methods of data processing, and more specifically to systems and methods for querying and associating rules for data associated with a distributed data processing system.

BACKGROUND

Description of the Related Art

The Internet of Things (IoT) promises to interconnect elements together on a massive scale. Such amalgamation allows interactions and collaborations between these elements in order to fulfill one or more specific tasks. Such tasks differ according to the context and environment of application. For example, tasks may range from sensing and monitoring of an environmental characteristic such as temperature or humidity of a single room to controlling and optimization of an entire building or facility in order to achieve a larger objective such as an energy management strategy.

Depending on the application, connected elements may be of heterogeneous and/or homogenous hardware which may facilitate sensing, actuation, data capture, data storage, or data processing. Each type of connected element hardware may have a unique data structure which details a digital representation of the physical capabilities of the hardware itself and/or measured parameters. For example, a temperature sensor may include temperature measurement, MAC address, IP address, and CPU type data. Each connected hardware element may possess a unique data structure. Accordingly, with the heterogeneity of these various data structures available through the wide variety of available hardware, efficiently analyzing and controlling this data becomes a serious challenge.

SUMMARY

Methods and systems are provided for searching and/or acting on information in a distributed data processing system. A method of processing a semantic rules engine may comprise receiving a rule data set, identifying a set of connected elements based on the rule data set, evaluating conditions related to the set of connected elements and the rule data set, determining a command set based on the evaluated conditions of the set of connected elements, and executing the command set.

Principles of the disclosure demonstrate the semantic rules engine may be configured with a particular grammar. Further, the particular grammar may include elements that facilitate filtering, aggregation, resources, capability, and/or inferential functions. A rule data set may be filtered for a data field associated with one or more connected elements. Any inferring relationships between connected elements may be determined by ontological operations. Further, associated filtered data fields may be selected from a group including device type, class, capability, or communication protocol.

Principles of the disclosure further demonstrate; the semantic rule data set may create business rules to express system requirements. Further, the rule data sets may be aggregated, deployed locally, or remotely. A rule data sets may include elements that facilitate installation, activation, deactivation, or uninstallation and may further comprise identifying actionable connected elements within the rule data set. Additionally, the semantic rule engine may further comprise updating the rule data set associated with a connected element or when one or more connected elements are virtual elements. Also, a semantic search engine may operate with the semantic rules engine.

BRIEF DESCRIPTION OF THE DRAWINGS

These accompanying drawings are not intended to be drawn to scale. In the drawings, each identical or nearly identical component that is illustrated in various figures is represented by a line numeral. For purposes of clarity, not every component may be labeled in every drawing. In the drawings:

FIG. 1B illustrates other embodiments of aspects of a system for facilitating a semantic search and/or rules engine method illustrated in FIG. 1A;

DETAILED SUMMARY

Figure 1A:
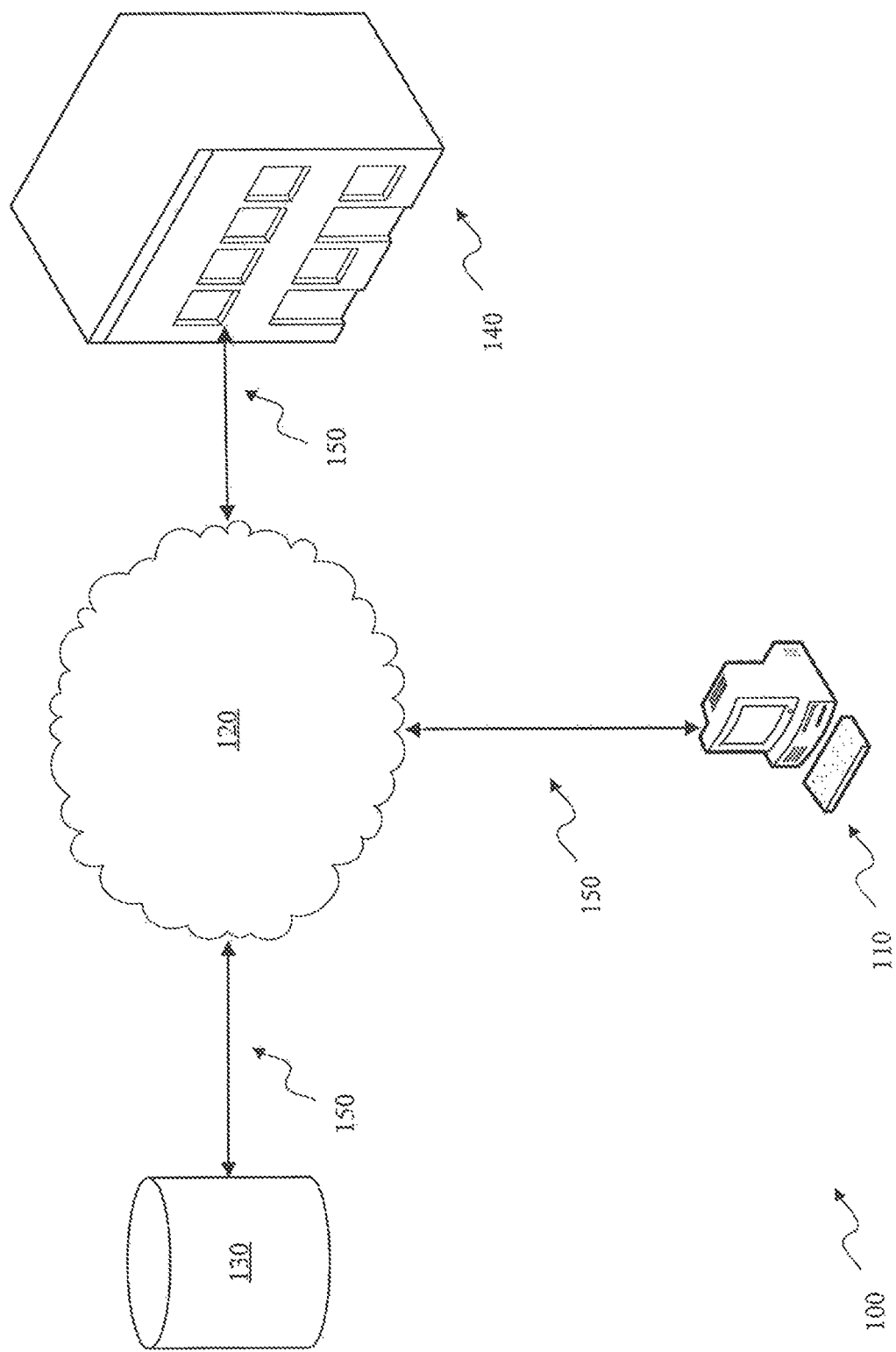
FIG. 1A illustrates aspects of a system for facilitating a semantic search and/or rules engine method in accordance with various embodiments of this disclosure.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e. "including but not limited to."

In the emerging world of the Internet of Things (IoT) or more generally, Cyber Physical Systems (CPS), a convergence of multiple technologies is underway to allow the sensing, actuation, data capture, storage, and/or processing from a large array of connected elements. These connected elements may be accessed remotely using existing network infrastructure to allow for efficient Machine to Machine (M2M) and Human to Machine (H2M) communication. During this communication, as the network of connected elements changes over time, an increasing amount of data from these connected elements will be generated and allow for correlations which have not been possible before. Issues of organizing dynamic sets of connected elements are exacerbated by the disparate heterogeneous nature of the associated data structures.

With this plethora of hardware and associated data structures, a problem of organizing and analysis of data emerges as a wide variety of data structures may be received at a single processing point from the vast network of connected elements. A need exists for the ability to process, request, and/or analyze data from heterogeneous sources from the connected elements. Each individual connected element may contain multiple data characteristics from a data structure that are similar to other individual or group of elements. Yet, even with these similar data characteristics, efficiently querying for these similar data characteristics across the plethora of different connected elements is a significant challenge. One method to solve this problem of data heterogeneity involves the implementation and execution of structured semantic queries.

A solution to the data challenge is the use of structured semantic queries that solves two distinct problems. First, is to solve the issue of data heterogeneity delivered from a connected system which contains various data structures. Second is to filter and aggregate this heterogeneous data from the connected elements and provide only required and relevant data to a user, cloud platform, and/or other repository.

Example applications of implementation and execution may include, but are not limited to, (1) managing HVAC systems to assure the comfort of facility occupants, (2) maintenance of a particular environmental air quality (which may consist of temperature, humidity, and carbon dioxide content) for storage or occupants and dynamically adjusting a working building environment according to the prevailing weather conditions, (3) manage a facility management through controlling and optimizing regarding energy consumption through active control of lighting, heating, and cooling, and (4) monitor day to day operations, maintenance, and oversight of facility operations. Commercial embodiments of such applications may be a part of building management or automation system.

It is to be understood that the system described herein facilitates significant flexibility in terms of configuration and/or end user application and that although several examples are described a number of alternative embodiment configurations and applications are also possible.

Generally, such tasks are performed by individuals who are relatively non-technical in nature and require a rich interactive experience which hides the complexity of the data heterogeneity problem. Advantages of the various embodiments contained herein include, but are not limited to; allowing for the search of specific connected elements or associated data structures; configuring of alerts and notification messages adhering to a facility specific architecture without intimate knowledge of same; allowing for execution of facility specific queries to determine real-time metrics such as energy consumption by area; and/or configuring any type of data structure to collect in a manner that does not require translation of units or other specific constructs.

FIG. 1A illustrates a representation of a system for implementation and execution of a semantic search method 100 in which various embodiments of the present disclosure may be implemented. The system for a semantic search method may include one or more general purpose computers 110, one or more data storage arrays 130, a cloud computing environment 120, a building or other structure 140 which contains one or more connected elements (not shown), and network connections 150 to allow the exchange of data between these parts of the system.

In one embodiment of the system illustrated in FIG. 1A, the building 140 contains one or more connected elements that perform sensing, actuation, data capture, storage, or processing for the monitoring or management of the building 140. Any variety of connected elements may be used to capture, store, or process data, or actuate associated devices over the network connections 150, to the cloud computing environment 120, to other parts of the system. These connected elements may, for example, detect temperature, humidity, ambient light, sound, smoke, carbon monoxide, carbon dioxide, motion, non-conductive fluids, conductive fluids, vibration, energy, power, voltage, current, or any other desired characteristic, and combination thereof. Connected elements may also operate or articulate elements, components, and/or other systems such as turning on lights, opening a door or window, moving window shades, or triggering a door lock. Connected elements may also process data structures from other connected elements or propagate data structures from one or more connected elements to one or more other connected elements. Any number of connected elements may be deployed in any combination to monitor or manage a physical space. Examples of such a space may include a closet, room, building, campus, office, promenade, or any other desired location.

Each building 140 containing a connected element may ultimately connect to a cloud-computing environment 120 through a network connection 150. This connection allows access to the cloud computing environment 120 by a variety of devices capable of connecting to such an environment in either a wired or wireless connection manner. From FIG. 1A such devices may include one or more general-purpose computers 110 capable of receiving input from a user or to provide autonomous operation. One or more data storage arrays 130 may be utilized to provide additional data storage capability. It should be appreciated a cloud computing environment 120, while providing additional communication paths to additional elements or systems, is not required as part of the semantic search method. Other embodiments contemplate self-contained or stand-alone systems.

The network connections 150 may be wired or wireless connection types. Such connections may include, but are not limited to, any physical cabling method such as category 5 cable, coaxial, fiber, copper, twisted pair, or any other physical media to propagate electrical signals. Wireless connections may include, but are not limited to personal area networks (PAN), local area networks (LAN), Wi-Fi, Bluetooth, cellular, global, or space based communication networks. Access between the cloud environment 120 and any other cloud environment is possible in other implementations these other cloud environments are configured to connect with devices similar to cloud environments such as the existing cloud environment 120. It is to be understood that the computing devices shown in FIG. 1A are intended to be illustrative only and that computing nodes and cloud computing environments may communicate with any type of computerized device over any type of network with addressable or direct connections.

FIG. 1B illustrates other embodiments of aspects of a system for facilitating a semantic search method illustrated in FIG. 1A. Such embodiments may have one or more general purpose computers operating an application specific program 170 to act as a management system which may be connected wired or wireless to a cloud computing environment 180, which in turn may be connected to one or more building environments 190. Areas in each building environment 190 may contain one or more connected elements. These connected elements may, for example, detect temperature, humidity, ambient light, sound, smoke, carbon monoxide, carbon dioxide, motion, non-conductive fluids, conductive fluids, vibration, energy, power, voltage, current, or any other desired characteristic, and combination thereof. Connected elements may also operate or articulate elements, components, and/or other systems such as turning on lights, opening a door or window, moving window shades, or triggering a door lock and ultimately report data back to the application specific program 170 acting as a management system.

Figure 2:
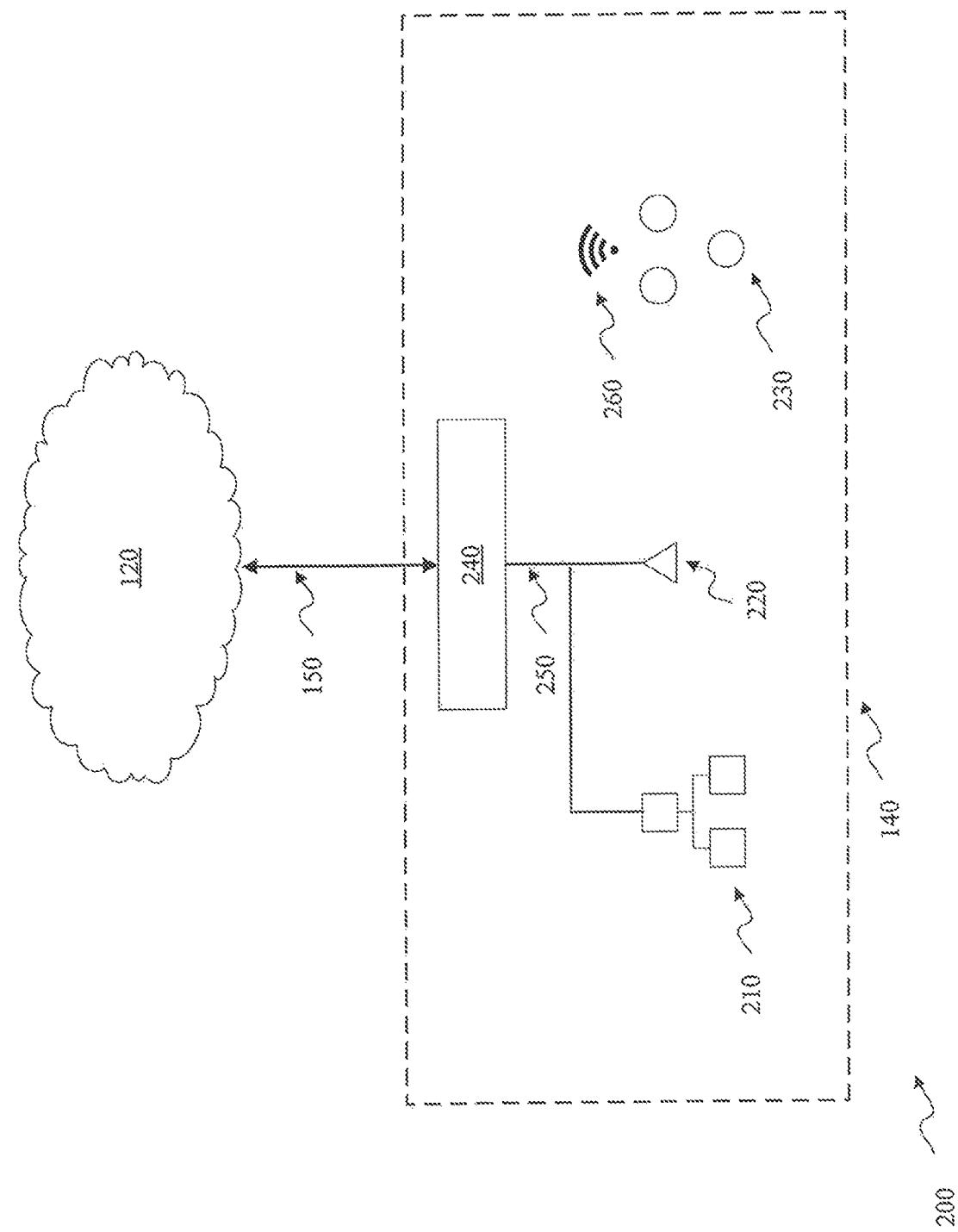
FIG. 2 illustrates aspects of how different types of devices may connect to the system for facilitating a semantic search and/or rules engine method in accordance with various embodiments of this disclosure.

FIG. 2 illustrates a representation of a portion of the system for a semantic search method 200 in which various embodiments of the present disclosure may be implemented. In one embodiment of FIG. 2, the building 140 contains one or more types of connected elements 210, 220, 230, 240 for the monitoring or management of the structure. These connected elements 210, 220, 230, 240 communicate via a wired 250 or wireless 260 networks and makes the data structures from each connected element available to the cloud environment 120 via the network connections 150.

Any variety of connected elements may be used to perform sensing, actuation, data capture, storage, or processing over the network connection 150, to the cloud computing environment 120, to other parts of the system. For example, connected elements may be connected sensors to measure carbon dioxide 210 for monitoring air quality of the building 140 and communicate via a wired network connection 250. Connected element may be both a connected sensor to detect ambient light and also an actuator 220 to change the state of an occupant light fixture and communicate via a wired network connection 250. Connected elements may be connected sensors for temperature and humidity 230 to monitor environment of the building 140 and communicate via a wireless network connection 260. Finally, connected element 240 serves as a connected gateway to communicate with the associated connected elements 210, 220, 230, via their respective network connections 250, 260, process the data structures of each, and transmit same to a network connection 150 for transmission to the cloud environment 120. It should be appreciated a cloud computing environment 120, while providing additional communication paths to additional devices or systems, is not required as part of the semantic search method. Other embodiments contemplate self-contained or stand-alone systems.

These connected elements need not be geographically localized or logically grouped in any way to utilize embodiments of this disclosure. Grouping connected elements geographically or logically may allow more economic use. A geographic grouping such as in an apartment, home or office building may be accomplished, as well as logically locating connected elements by function. One of many logical grouping examples may be locating connected end points designed to sense temperature, proximate to an occupied location to detect changes in environment. It should be appreciated that the groupings of connected endpoints may also be located on a very large geographic scale, even globally. Such global operations may be monitored through a network located in any number of facilities around the globe.

Figure 3A:
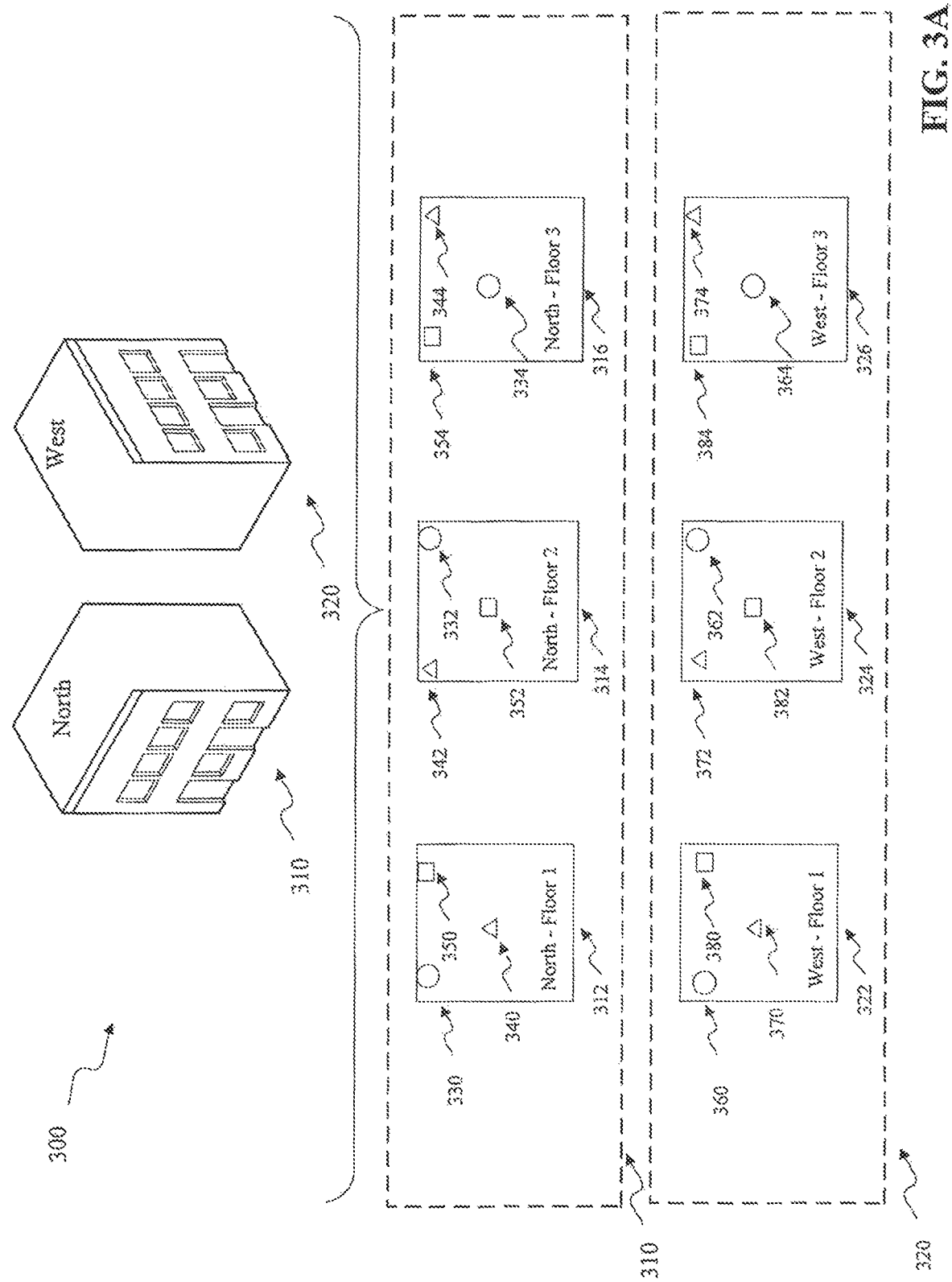
FIG. 3A illustrates an exemplary deployment of various connected elements of the system for facilitating a semantic search and/or rules engine method in accordance with various embodiments of this disclosure.

FIG. 3A illustrates exemplary deployment in context of various elements of the system for a semantic search method 300 in which various embodiments of the present disclosure may be implemented. A "North" building 310 and a "West" building 320 are illustrated. Each building has (3) floors associated with each. North Floor (1) 312, North Floor (2) 314, North Floor (3) 316 are contained within the North building 310. West Floor (1) 322, West Floor (2) 324, and West Floor (3) 326 are contained within the West building 320. Each floor has (3) connected elements of different types. For example, connected elements may be connected sensors to measure carbon dioxide 330, 332, 334, 360, 362, 364 for monitoring air quality of the building 310, 320 respectively and communicate via a wired network connection. Connected elements may be both a connected sensor to detect ambient light and an actuator 340, 342, 344, 370, 372, 374 to change the state of an occupant light fixture and communicate via a wired network connection. Connected elements may be connected sensors for temperature and humidity 350, 352, 354, 380, 382, 384 to monitor environment of the building 310, 320 respectively and communicate via a wireless network connection.

Figure 3B:
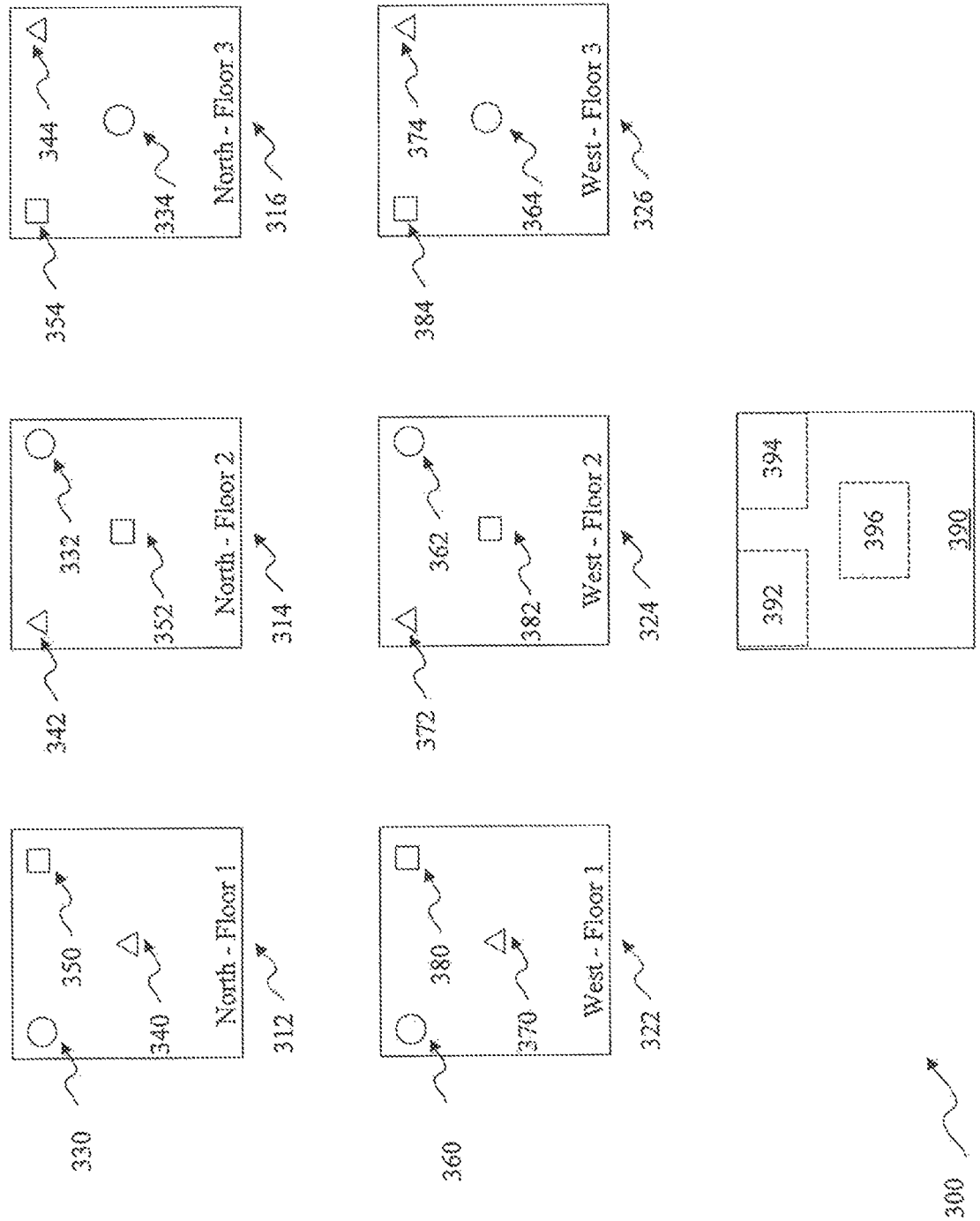
FIG. 3B illustrates exemplary deployment of connected elements across a variety of physical locations of the system that facilitates a semantic search and/or rules engine development and/or execution from FIG. 3A.

FIG. 3B illustrates exemplary deployment in context and logical placement of various elements system for a semantic search method 300 in which various embodiments of the present disclosure may be implemented. Within each floor of each building multiple connected elements exist. As an example, temperature and humidity 350, 352, 354, 380, 382, 384 carbon dioxide 330, 332, 334, 360, 362, 364, and ambient light 340, 342, 344, 370, 372, 374 connected elements exist on each floor of each building. Further, each connected element may exist in a distinct zone on each floor of each building. As one of many examples, a general floor plan 390 may indicate zones that are defined as "Zone 1" 392, "Zone 2" 394, and "Zone 3" 396. It should be appreciated that such designations are highly configurable by a user or other system and are shown here for illustrative purposes only.

Given the connected element configuration illustrated in FIGS. 3A and 3B, each connected element possesses a data structure that includes, but not be limited to, sensor specific information (temperature/humidity, carbon dioxide, and ambient light), geographic information (zone, floor, building), and network information (MAC address, IP address, wired, wireless). Other connected element information may be available as well as information relative to the operation of the connected element itself. As one example, a status of online or offline may be available to further add to the data construct for each connected element.

Once physical connections to the connected elements are put in place or established, a digital representation may be created. This process of translating the physical representation of the system to a homogenized taxonomy called semantic tagging. Semantic tagging links the data structures available from the connected elements of a particular system to a formal naming and definition that actually or possibly exist in physically represented systems, or ontology. For example, ontologies may include definitions such as location, relationships, usage, physical quantities, network protocol, or units.

Semantic tagging may occur in one of two ways, automatic or manual semantic tagging. Automatic semantic tagging may be accomplished by the system without user input. In this approach, each data structure for each connected element is examined and deconstructed by the system into corresponding data structure elements. During the identification process, it is determined what data structure elements exist for each connected element. Once each data structure element is defined, it is then mapped to a corresponding taxonomy and tagged with this taxonomy which in turn becomes part of that connect elements data structure. At least one data structure elements may be tagged during this process to allow all connected elements to be defined as part of the system.

Manual semantic tagging may be accomplished by the system with user input. As an example, this form of tagging may be performed during the installation of the system as whole, groups of connected elements, or individual connected elements. Similar to automatic semantic tagging each data structure for each connected element is examined or known to a user. Once the user identifies what data structure element is defined, a user may then select a mapping to a corresponding taxonomy. Once tagged with this taxonomy it in turn becomes part of that connected elements data structure. At least one data structure elements may be tagged during this process to allow all connected elements to be defined as part of the system. Other tools may be available to assist the user in identification of the particular data structure elements for the particular connected elements. Such tools may be used during commissioning of the entire system or portions of the system.

Figure 3C:
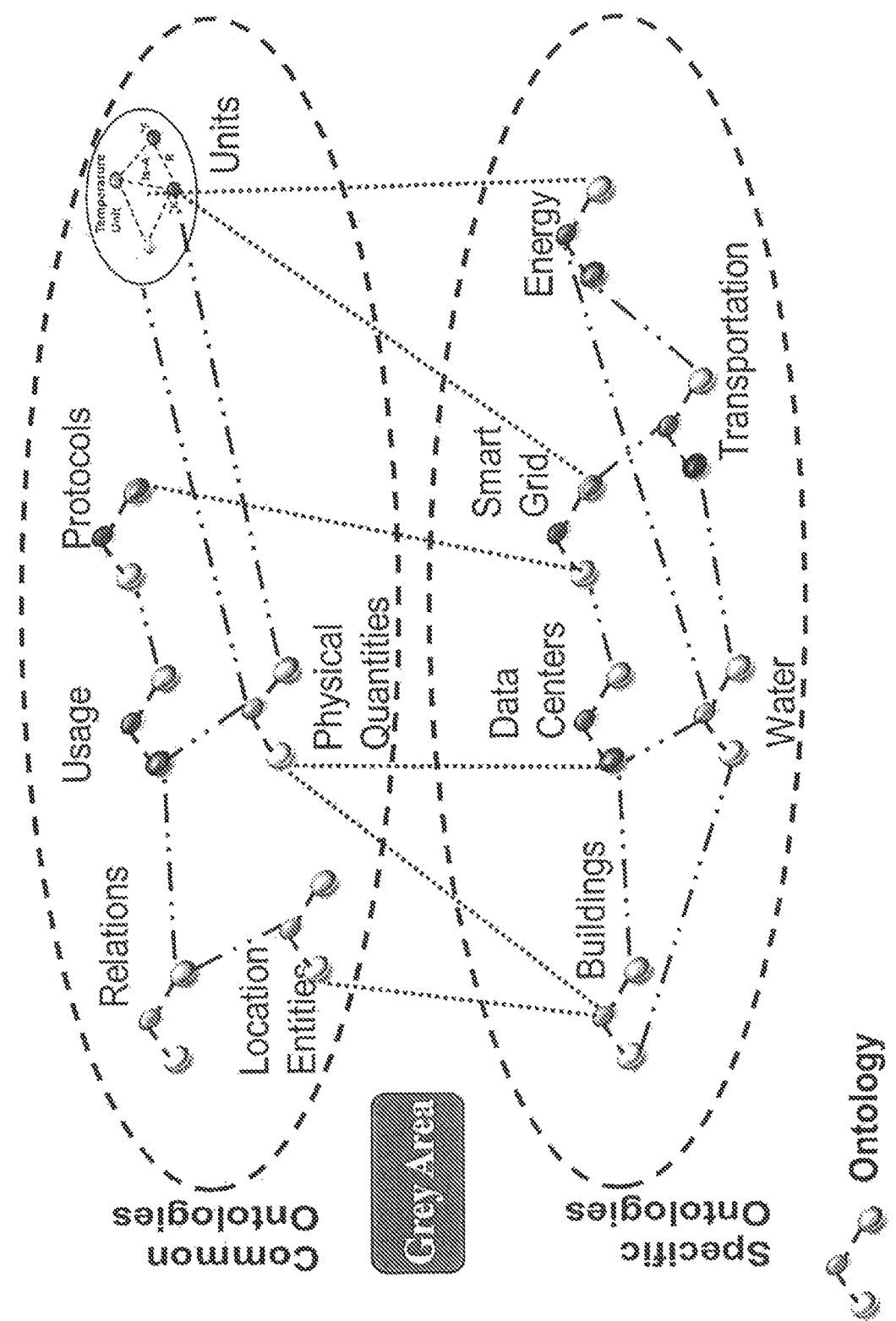
FIG. 3C illustrates exemplary data organization constructs of connected elements across a system that facilitates a semantic search and/or rules engine development and/or execution.
Figure 3D:
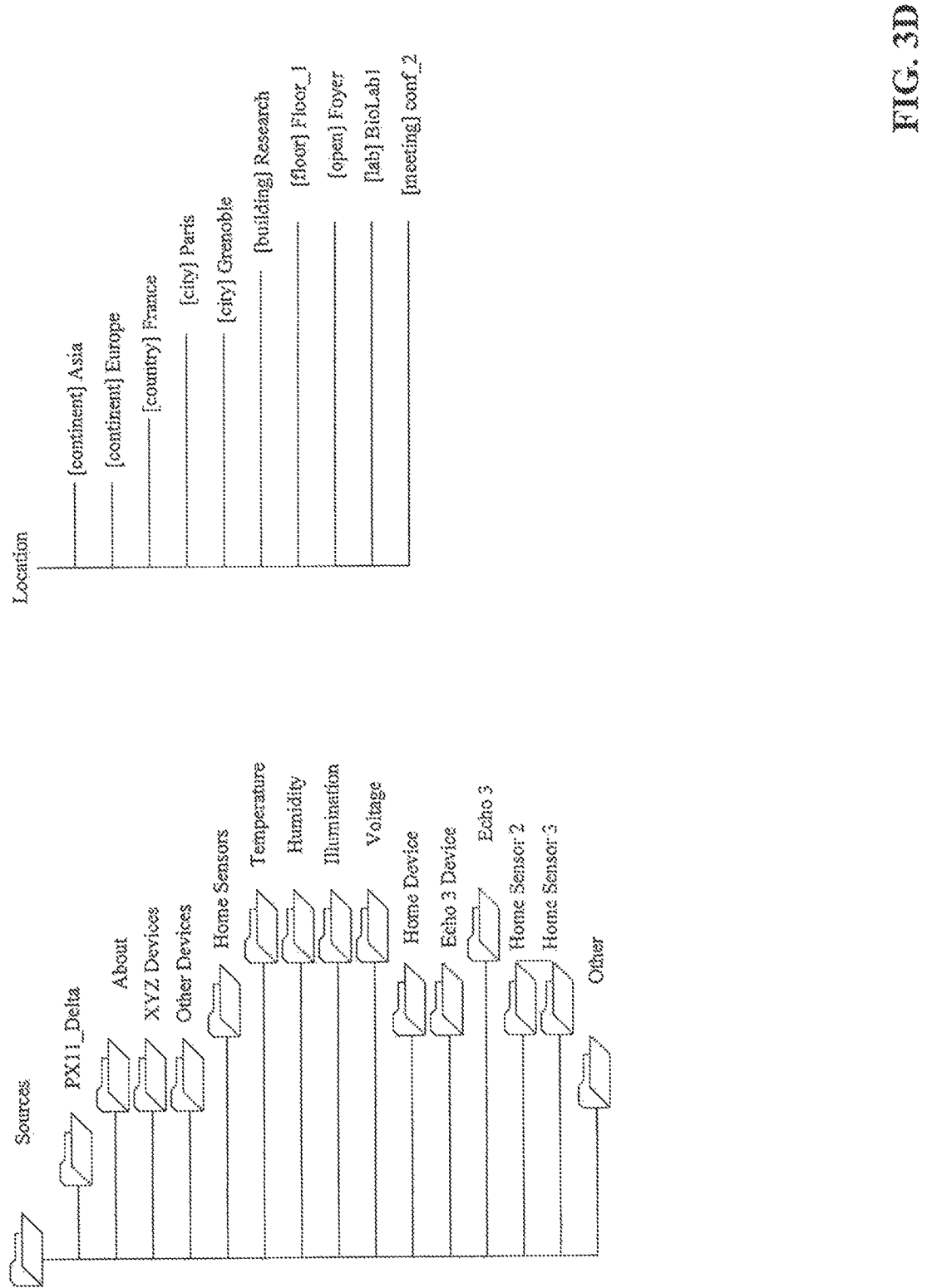
FIG. 3D illustrates exemplary data organization constructs within a user interface of connected elements across a system that facilitates a semantic search and/or rules engine development and/or execution.

FIG. 3C illustrates exemplary data organization constructs of connected elements across a system that facilitates a semantic search. It should be appreciated that any connected element type in any combination may exist in any geographic location and include additional information within a respective data structure. These exemplary data organization illustrates examples of ontologies such as protocols or usage as well as ontologies specific to the application such as data center or buildings. FIG. 3D illustrates exemplary output from a user interface which may be used to facilitate manual semantic tagging.

Once the process of semantic tagging is completed, a digital representation of the physical system is stored in one or more memory within the system. Each connected element may be represented by one or more corresponding data structures. Each data structure will contain data structure elements that describe the characteristics of the connected element. As one of many examples, the connected element possessing a carbon dioxide sensor 330, will possess an associated data structure describing the characteristics of the sensor. Each data structure will be composed of a number of data structure elements. Each connected element will possess a data contracture and one or more data structure elements. Data structure elements for this carbon dioxide sensor 330 may include, physical quantities (carbon dioxide), measured units (Parts Per Million), location (North Building, Floor 1, Zone 3), protocol (MODBUS), network (wired, IP address), and usage (buildings).

It should be appreciated that while each connected element may have one or more associated data structure, the number of data structure elements may vary based on the particular configuration or application. Once the connected elements data structures are organized in this way, multidimensional analysis may be performed without discrete or in depth knowledge of the physical system and the associated connected elements.

Figure 4A:
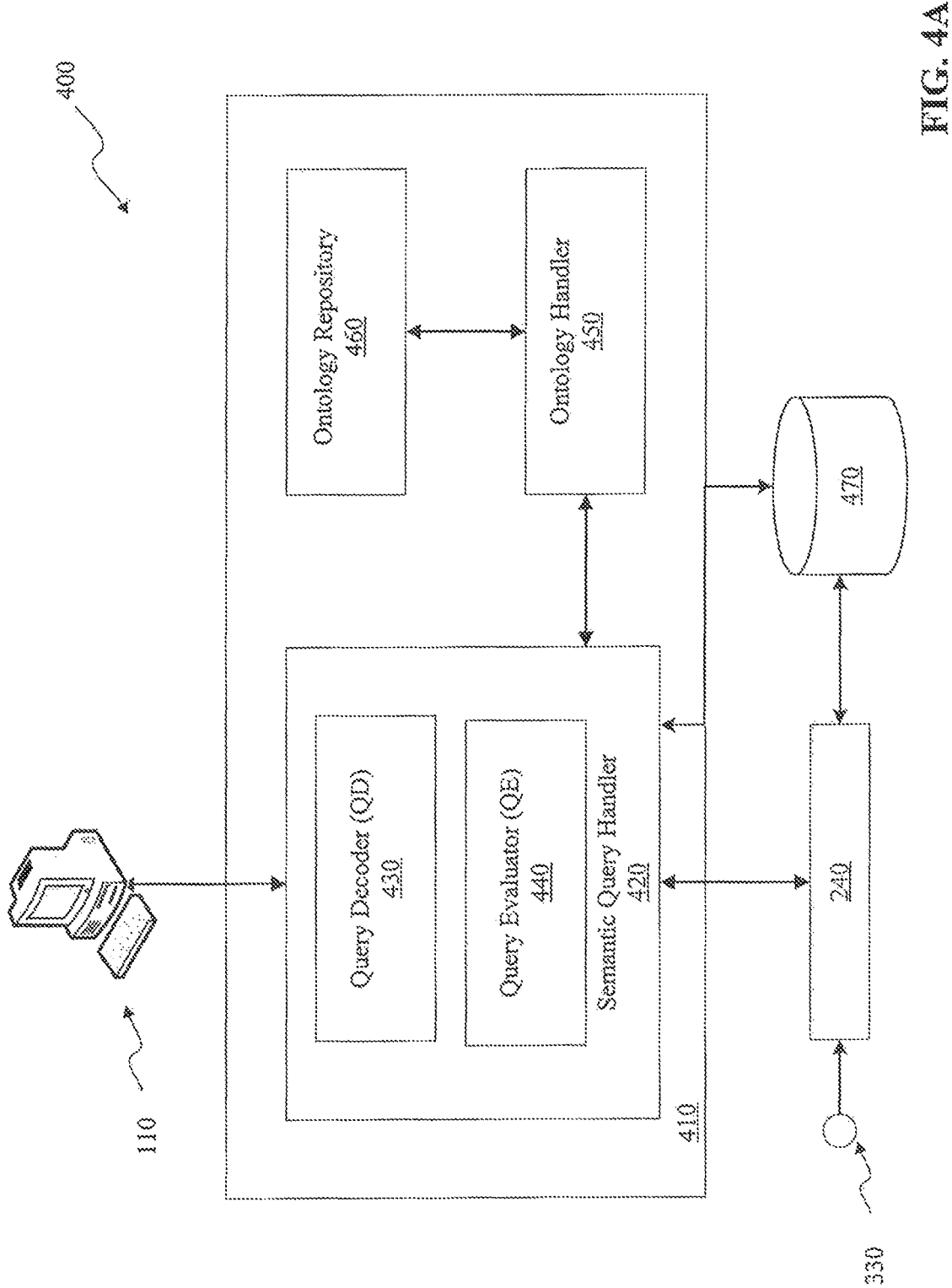
FIG. 4A is a block diagram of components of the system for a semantic search and/or rules engine development and/or execution.

FIG. 4A is a block diagram of the system components for a semantic search method 400 in which various embodiments of the present disclosure may be implemented. It is possible for either a user and/or another process from a machine to begin a semantic search. A user-initiated search may begin at a general-purpose computer 110, in other implementations a machine-initiated process may derive from any other process in the system. It should be appreciated the methods of initiation of a semantic search are not mutually exclusive from each other. In both cases, the query processed by the Semantic Search Engine 410, is a structured search query with a particular grammar. This grammar structure may include the use of various data structure elements, filtering, basic aggregation, publish and subscribe, and inferential functions.

In one embodiment, a structured search query may include one or more filtering expressions. Search Device protocol:ZigBee and quantity:temperature and location:Lab101 With (name==TempSensor and value >22 and with unit==_F) will search for ZigBee wireless sensors in Lab 101 named "TempSensor" with values greater than 22° F. In an alternate embodiment, basic aggregation functions are supported such as Min, Max, Sum, Avg. For example, Sum Variable measures:ActiveEnergy and usage:Lighting and location:Building2 calculates the sum of all active lighting sources in Building 2. In another embodiment, Publish and/or Subscribe functionalities, may be applied to connected elements in a specific location for a given measurement type. Subscribe Device protocol:zigbee and quantity: temperature and location:Floor1 with value >22 and with unit==_F every 00:10:00 from 2016-03-21 to 2016-04-21, analyses when particular connected elements become available. In another embodiment, inferential functions such as @type:sensor may be used to infer relationships between connected elements.

Structured search queries are received into Semantic Query Handler 420, which is composed of the Query Decoder (QD) 430 and the Query Evaluator (QE) 440. The Query Decoder (QD) 430 analyses the structured search query and deconstructs it into query elements. Query elements are passed to the Query Evaluator (QE) 440, to analyze the query elements and perform operations on the system based on the analysis. A structured search query may include an inferential function regarding a particular connected element. In this case the discrete connected element is not known, but information regarding same is requested. Here, further analysis is performed by the Ontology Handler 450, which further processes the data structure elements for the inferential reference contained in the structured search query and accesses the Ontology Repository 460 for the available inferential references to the appropriate connected elements.

For example, a connected element is a carbon dioxide sensor 330 queried by a user for the value of the environment. A user inputs a structured query into a general-purpose computer 110. The Query Decoder (QD) 430 decompiles the structured search query and passes the query elements to the Query Evaluator (QE) 440 that performs operations to collect the data. In this example, only the current value of carbon dioxide at the sensor 330 is requested. The Query Evaluator (QE) 440, requests the complete data structure for the connected element. This data structure is transmitted from the connected element acting as a gateway device 240 for the carbon dioxide sensor 330. The entire data structure of the carbon dioxide sensor 330 is collected from the connected element acting as a gateway device 240 and the data is transmitted to the Semantic Query Handler 420 and to the general-purpose computer 110. It should be appreciated that the data structures for analysis may be from near real time connected elements such as the connected element acting as a gateway device 240 or data repositories 470 which contain the data structures. Such decisions are based on state of the system and the structured search query.

Figure 4B:
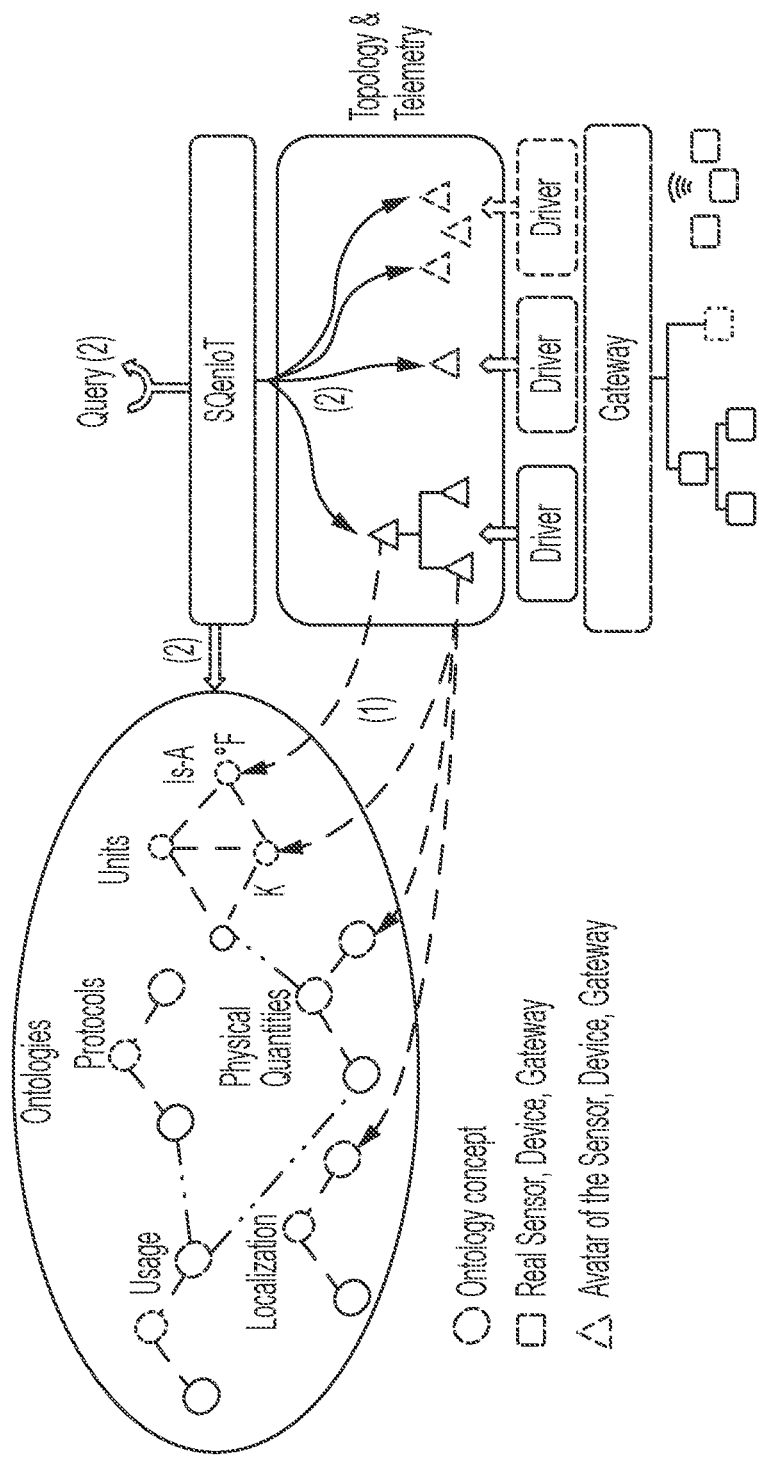
FIG. 4B is an alternate representation of components of the system for a semantic search and/or rules engine development and/or execution.

FIG. 4B is an example of an implementation of components of the system for a semantic search method in accordance with various embodiments of this disclosure.

Figure 5A:
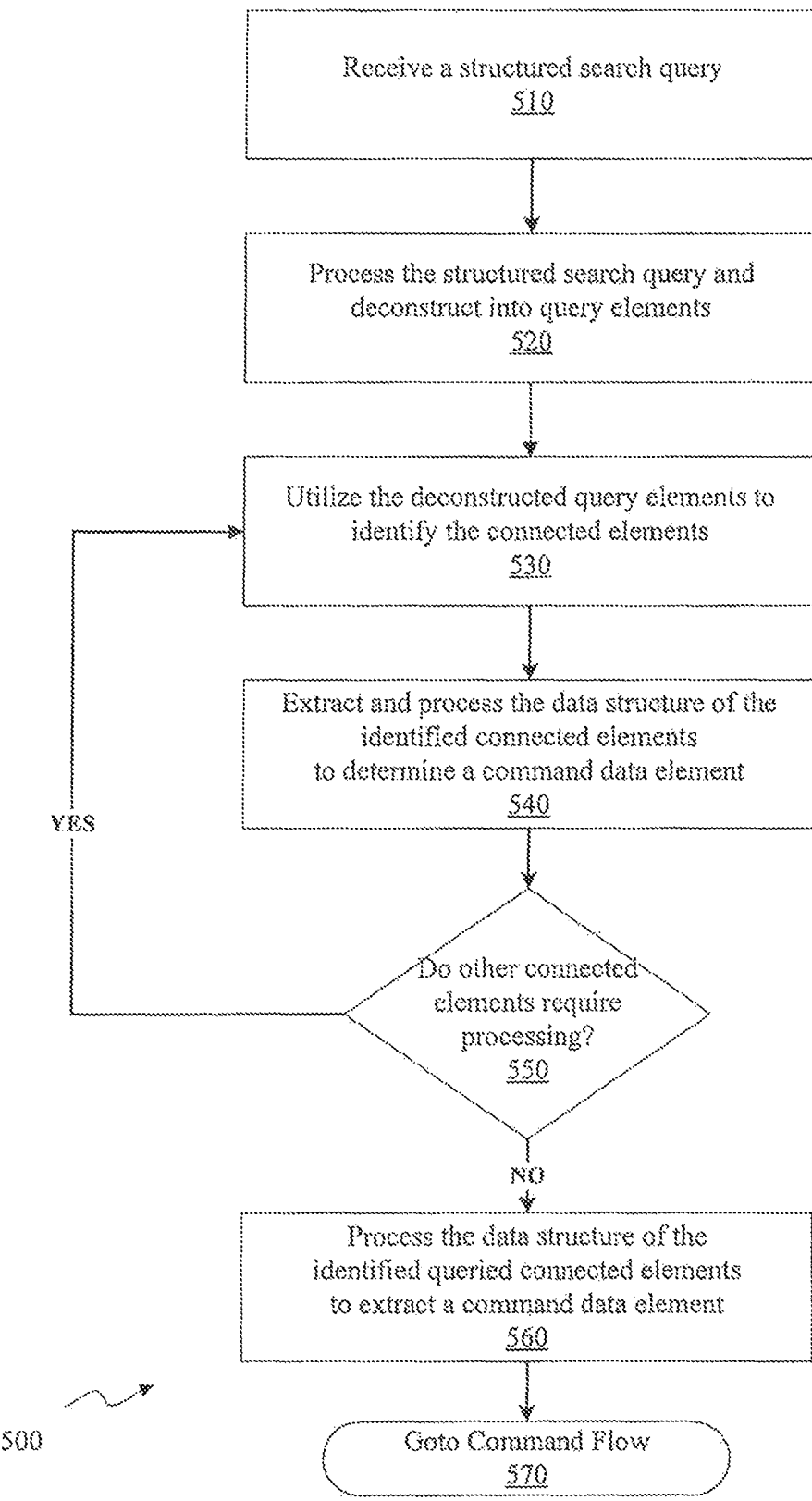
FIG. 5A is a flow diagram for executing a semantic search and/or rules engine development and/or execution.

FIG. 5A is a flow diagram of a semantic search method 500 in accordance with various embodiments of this disclosure. As discussed supra, a structured search query is received for one or more connected elements 510. It should be appreciated that one or more connected elements may be the target of the semantic search. This query is received directly from a user or another machine. One received, the structured search query is deconstructed into its composite query elements 520. Query elements are processed by the Semantic Search Engine to identify which of the connected elements require examination of their respective data structure 530. The data structure for each identified connected element extracted and processed to determine what data structured elements match the query elements of the structured search query and to determine a command data element 540. This command data element is used to determine additional processing required to complete the structured search query. Embodiments of the disclosure allow for analysis of multiple data structure elements of multiple data structures, which correspond to multiple connected elements. Decisions are made to determine if other processing is necessary 550. If not, processing is performed for the data structure on each identified connected element to determine the command data element for each identified connected element 560. Commands are then separated by type 570.

Figure 5B:
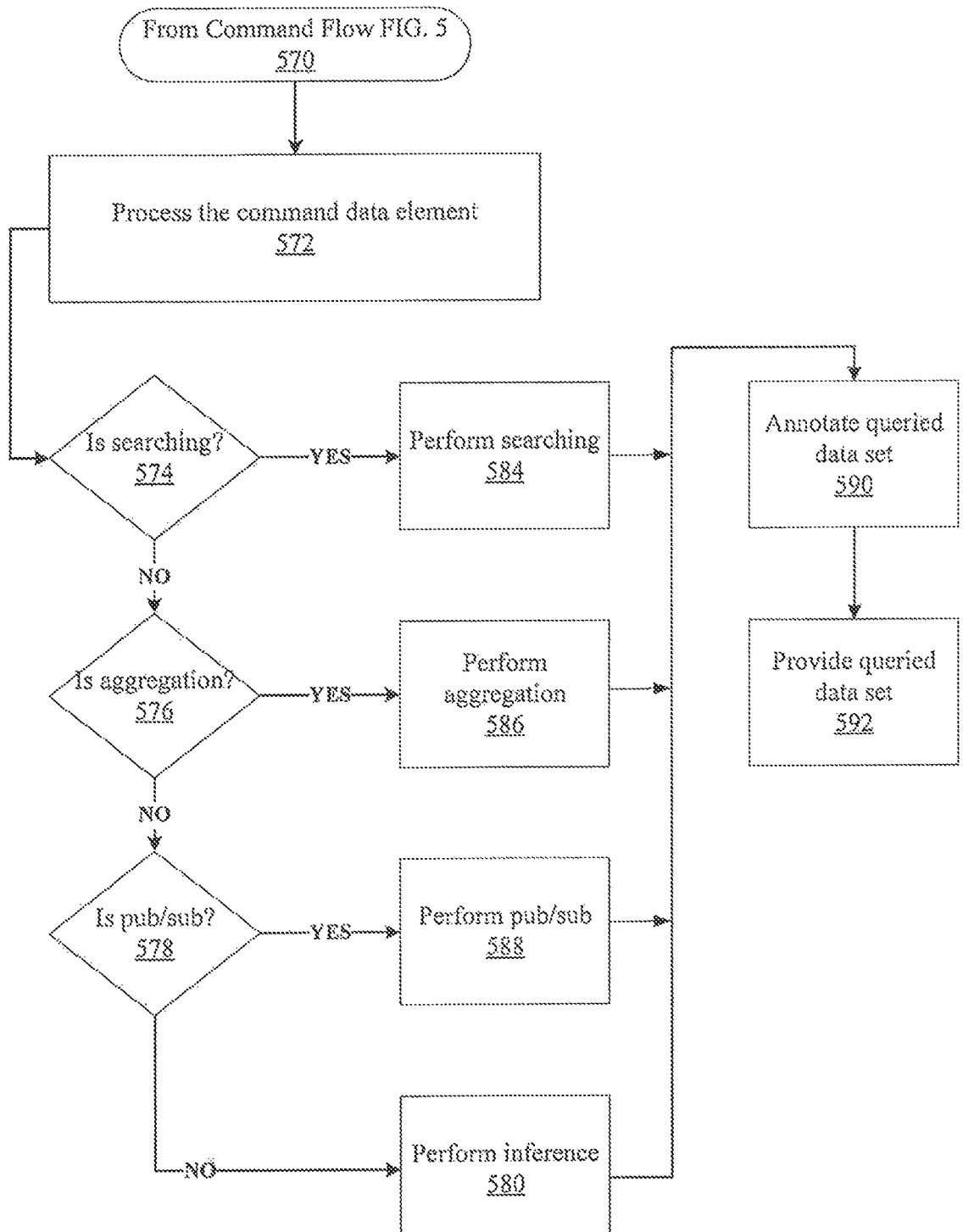
FIG. 5B is a flow diagram of exemplary command functions for a semantic search and/or rules engine development and/or execution.

FIG. 5B is a flow diagram of exemplary command functions for a method for a semantic search method. From FIG. 5 commands are separated by type 570. Command data is processed top determine further processing. These types include searching commands 574, aggregation commands 576, publishing and subscription commands 578, and localized inference commands. Once the determination is made, the command is carried out for searching 584, aggregation 586, publishing and subscription 588, and localized inference 580. Once the result of processing the commands is complete for all identified connected elements, annotation of the data is performed to form a queried data set 590. This queried data set is the result of the initial query along with any actions taken as part of the commands processed. This queried data set is provided 592 to the general-purpose computer to be used by the user and/or the system that made the initial query.

It should be appreciated from the foregoing; the use of structured semantic queries solves two distinct problems. First, is to solve the issue of data heterogeneity delivered from a connected system which contains various data structures. Second is to filter and aggregate this heterogeneous data from the connected elements and provide only required and relevant data to a user, cloud platform, or other repository. It should also be appreciated a semantic search may exist as a standalone system which receives data from any number of connected sources.

In an implementation, it is possible for an integrated solution—a combined system of a semantic search engine and a semantic rules engine to analyze, create, develop, execute and control various connected devices utilizing executed business rules. For example, the data generated by the semantic search engine may in turn be provided to the semantic rules engine and harnessed through the development of rules executed by a semantic rules engine associated with a particular system to analyze, create, and perform tasks on that system, or stored in a library or other repository and used on other systems.

In another implementation, the semantic rules engine may exist as a standalone system and/or system module which receives data from any number of connected sources. Again, the semantic rules may be developed and executed to facilitate control of connected sources, as well as a control strategy on the selected system(s). This control strategy may be configured at run-time without disrupting the operation of the devices and rule life-cycle may be associated with any or all rules to allow robust management of the selected system(s).

Figure 6:
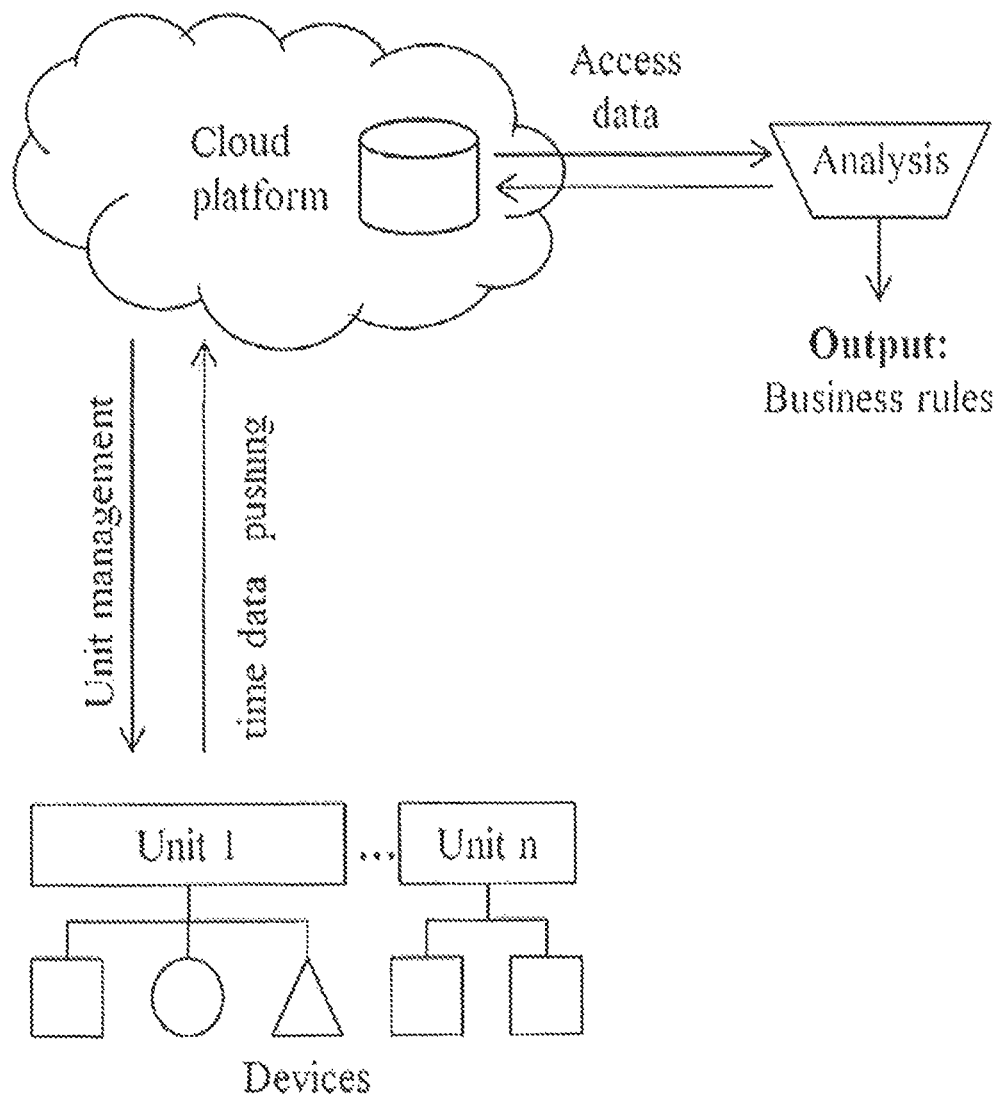
FIG. 6 illustrates alternate embodiments of a system for facilitating a semantic search and/or rules engine development and/or execution.

In an example, a semantic rules engine operates with a semantic search, to enable a facility manager who to determine and harness the data generated by any number of he devices in a facility, such as the example system illustrated in FIG. 6. In addition to determining device data, the semantic rules engine may be used to configure parameters for none, some, and/or all of the devices depending on the data that has been received and processed. In one example, the connected devices may transmit their data after certain intervals and send alerts when certain events occur. After a period of time, the facility illustrated may install new air-conditioning units that manage temperature by regulating the use of associated compressors. Now, a facility manager may also want to query the information about these new air conditioning units, utilizing a semantic search, and to shut them down, utilizing rules derived from a semantic search engine, when they consume more energy than a specific pre-determined threshold to save energy.

From this embodiment, there are generally two paths to facilitate an implementation of a semantic search, a semantic rules engine, or combined semantic search and rules engine combination, to analyze, develop, and/or execute rules. First, is to utilize a tailored solution, where a search or rules are built for a specific embodiment and as new requirements arise, reconfigure a new solution. This option may not scale well and may be a roadblock to adapt to new embodiments quickly or implement new business rules more efficiently. A second option may be to have a more flexible solution that may be implemented which does not require reconfiguring a complete solution and realizes the benefits of a semantic search, a semantic rules engine, or combined semantic search and rules engine combination. In this embodiment, the potential solution may have the following characteristics: (1) expressing requirements and conditions in an explicit manner to control the devices and/or to send alerts; (2) deployment strategy of these requirements may be localized in the devices; (3) an efficient mechanism to execute these requirements programmatically; and (4) contextual query capability to gain insights about the current status of the devices and/or energy consumption, or any other desired characteristic of a system.

In addition to these requirements, the proposed solution may be suitable for embedded environments, easily integrated into any existing devices, modular in design to allow evolution of the solution, independent of device types, and/or independent of protocol or application domain constraints.

Figure 7:
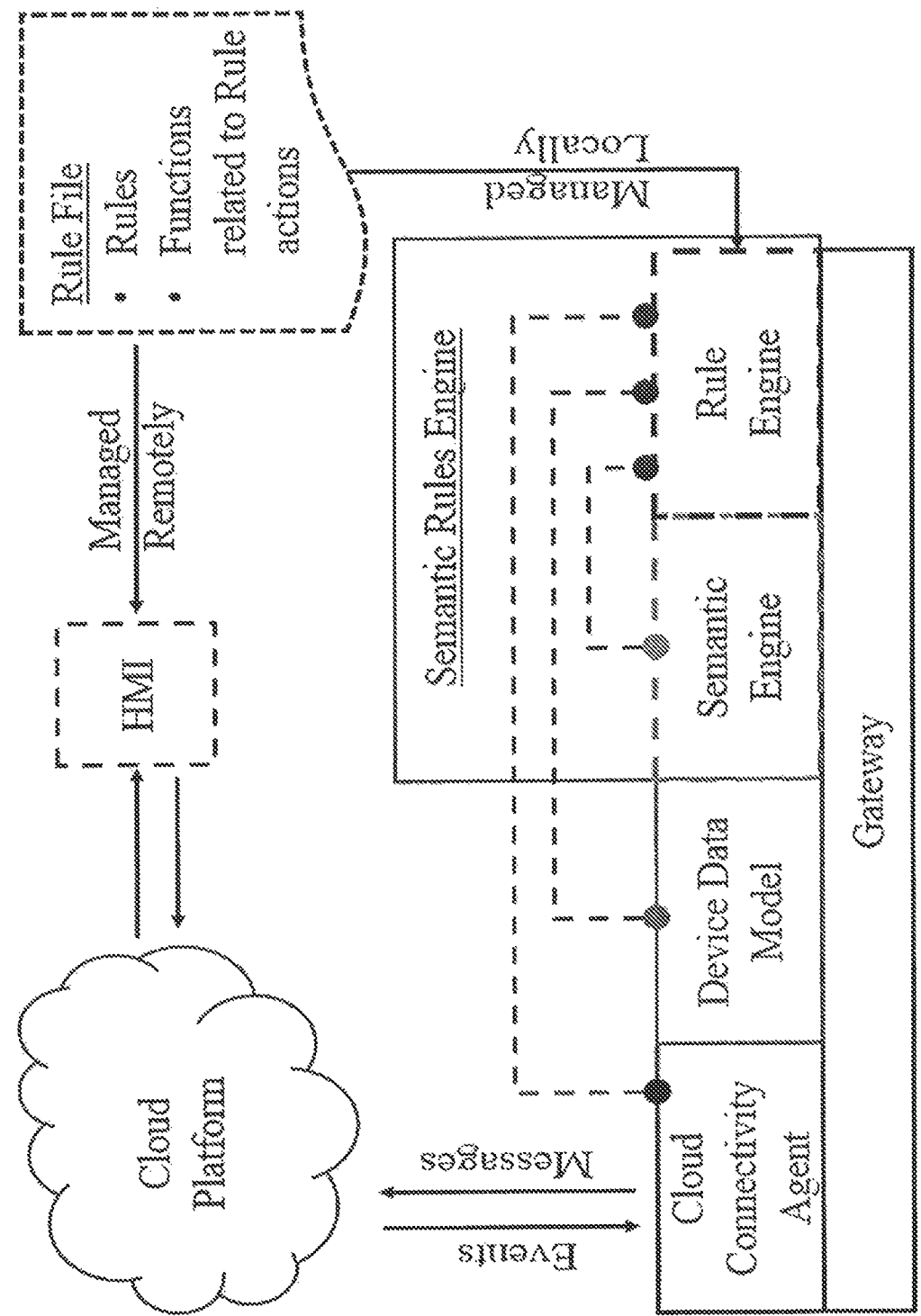
FIG. 7 illustrates alternate embodiments of an architecture for facilitating a semantic search and/or rules engine development and/or execution.

FIG. 7 illustrates alternate embodiments of an architecture for facilitating a semantic search and/or rules engine method in accordance with various embodiments of this disclosure. A Semantic Rules Engine (SRE) may be comprised of two parts, a Rule Engine and Semantic Search Engine. While both may be used in conjunction with each other, it should be appreciated this is not a limitation of the system and one or both may be used independent of the other.

A semantic rules engine may contain the following features: (1) utilize business rules to explicitly express user and/or system requirements and conditions in an unambiguous and contextual manner; (2) utilize the capability of a device (e.g. a gateway) to deploy business rules either locally and/or remotely; (3) dedicated business rules execution engine to analyze, create, and/or execute the business rules; (4) utilize SemanticWeb and Ontology concepts to provide consistent, reusable and shareable views regarding the data; (5) query language which is contextual with a natural language-like grammar; (6) an efficient mechanism to analyze user and/or system queries; (7) develop a solution in a modular way to integrate and extend with new functionality in the future.

With the SRE any user and/or system requirements, regarding control or information, are expressed in the form of rules. These rules are designed so that they are able to: (1) evaluate conditions related to resources and/or their capabilities; (2) perform control of resources and/or capabilities when these conditions are met; (3) notify a user and/or system when a certain condition has been met; (4) provide a life-cycle to each rule that allows the rule to be installed, activated, deactivated, and/or uninstalled; (5) cooperation between rules allowing for, in one example, multiple rules to reuse the same action definition.

Figure 8:
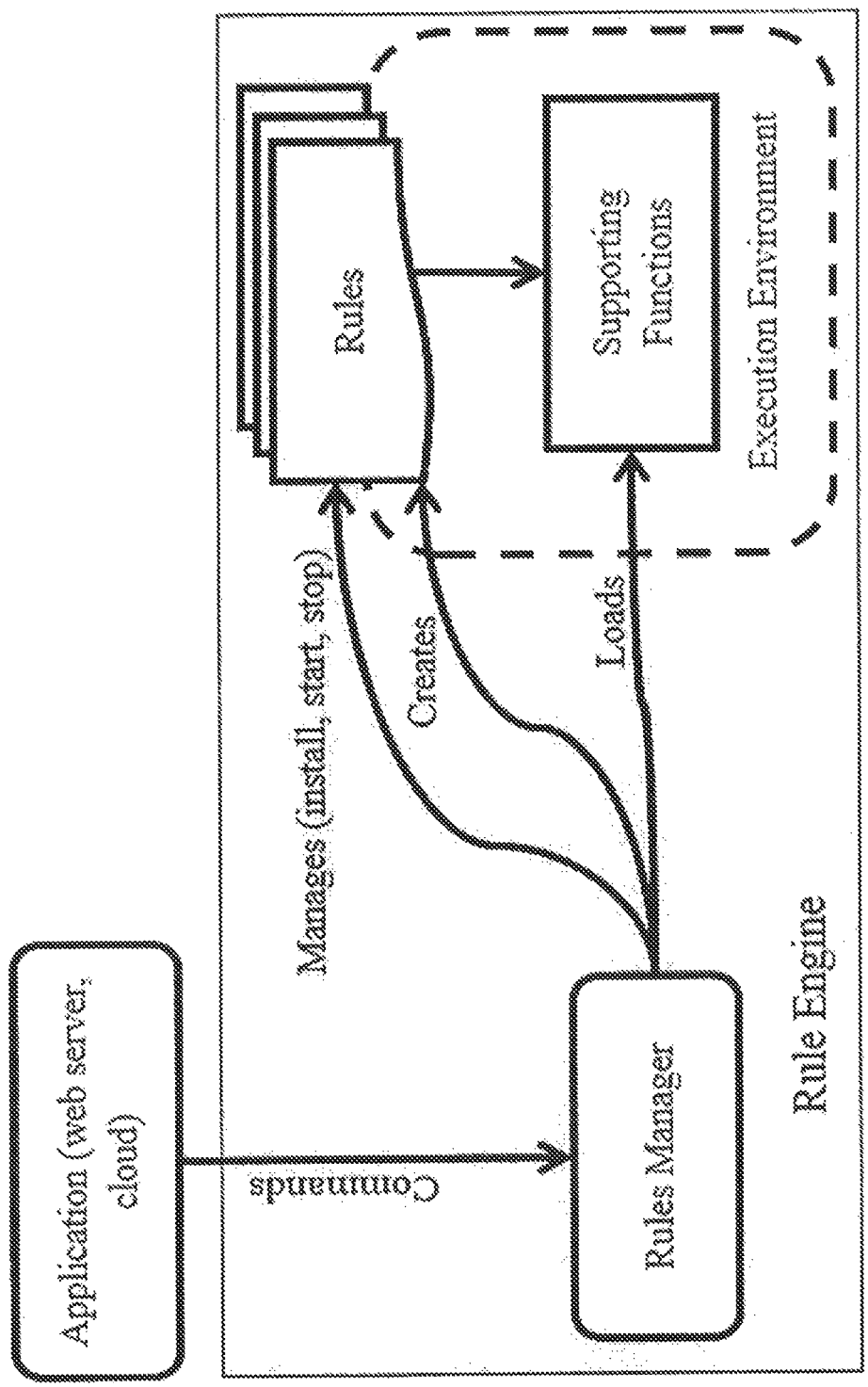
FIG. 8 illustrates alternate embodiments of a system for facilitating a semantic search and/or rules engine development and/or execution.

FIG. 8 illustrates alternate embodiments of a system for facilitating a semantic rules engine method in accordance with various embodiments of this disclosure. The Rules Engine is the other component of the Semantic Rules Engine. It provides gateways devices with the decentralized intelligence and/or the ability to control any attached devices.

A rules manager module may interact with the remote applications to receive rule files and/or commands to manage them. A rules manager loads the execution environment to run and manage all the rules. An execution environment is typically a set of supporting functions that are needs to provide the required functionality. These supporting functions handle subscriptions, the timers and interactions with other components of SRE like Semantic Engine and Cloud Connectivity Agent. Once the execution environment is created, the rules manager can create rules and manage them (e.g. install, start, stop and/or delete). Each rule may be executed in isolation so that any anomalies with one rule does not affect others.

In order to administer rules in a contextual basis, the semantic search engine, detailed above, may be used. For SRE, the concept of the semantic search engine is utilized to allow the Rule Engine to make semantic based queries and use returned results to execute rules.

The provided simple query language greatly facilitates this interaction between the two Engines. This is a differentiating factor from other solutions such as If This Then That (IFTTT). As one of many examples, a rule may use a location tag as a means to obtain a list of sensors to make comparison of their current values against a threshold specified in a rule. A semantic search engine may do the filtering of all the sensors using the location tag and provides only the relevant ones to the Rules Engine as result. A Rule may then do the comparison on any results and execute an action, for example, notification, alarm, and/or an actuation, according to the logic specified in the rule.

An alternate embodiment may be the same rule is executed periodically and before its next execution, some new sensors are installed in the same location. Use of a semantic query engine will return both new and old sensors when executing the same semantic query in its next execution. Hence, there is no need to change the rule logic. In this example, the Rule Engine becomes independent of any topology change.

Overall, having this capability allows SRE to become a flexible solution in which the same rules may be reused in different products and solutions as long as the concepts (such as location in above embodiment) are similar. This provides several benefits including but not limited to, time and cost savings, similar functionality irrespective of device, installation or customer.

Figure 9:
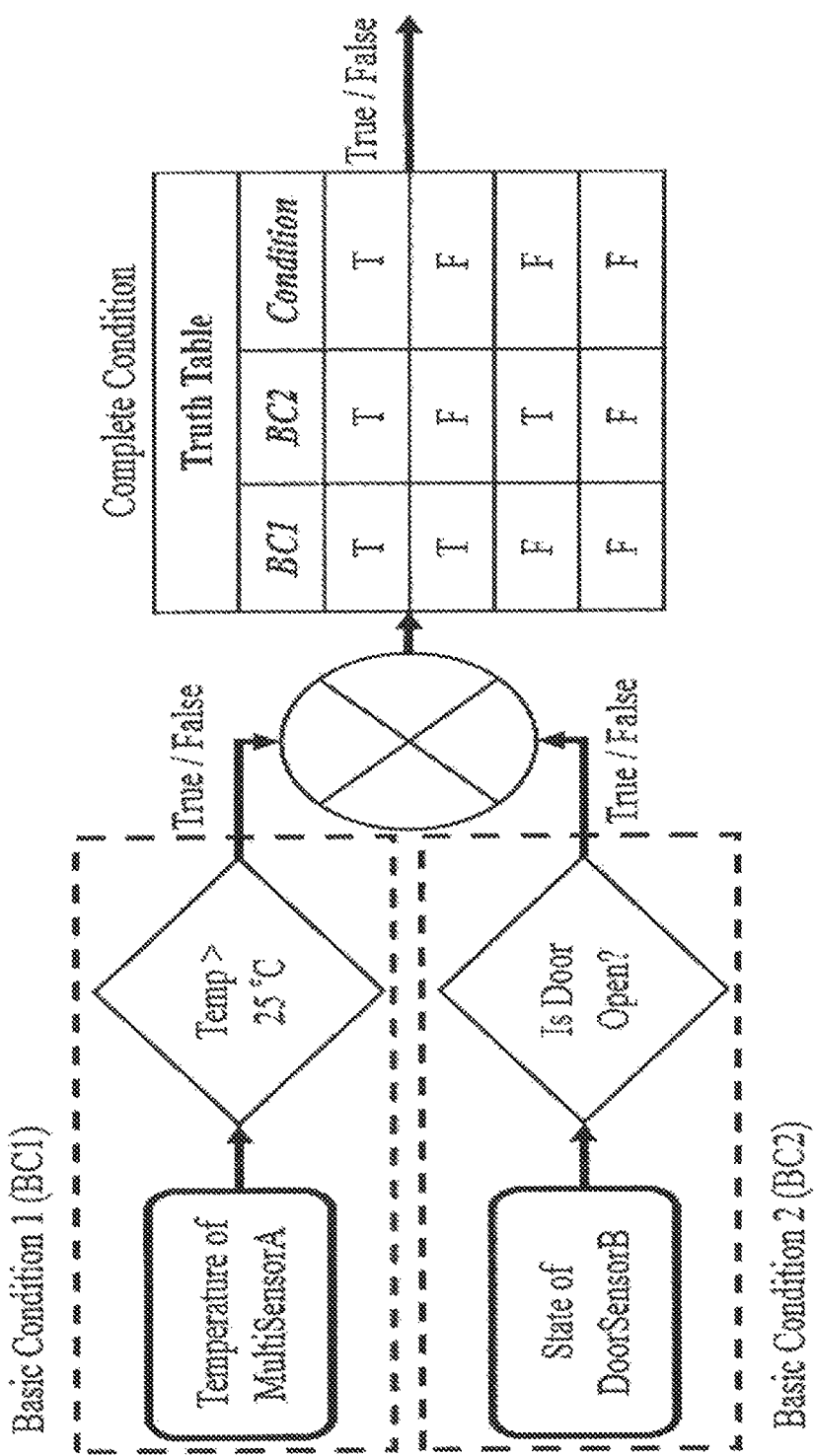
FIG. 9 illustrates embodiments of combining rules engine conditions to facilitate combinational logic with a semantic search and/or rules engine development and/or execution.

FIG. 9 illustrates embodiments of combining rules engine conditions to facilitate combinational logic with a semantic rules engine method in accordance with various embodiments of this disclosure. User and/or system requirements, regarding control and/or information, are expressed in the form of rules. As such the rules are designed with the following characteristics: (1) evaluate conditions related to resources and/or their capabilities; (2) perform control of resources and/or capabilities when these conditions are met; (3) notify a user when a certain condition has been met; (4) provide a life-cycle to each rule that allows the rule to be installed, activated, deactivated and/or uninstalled; (5) cooperation between rules allowing for, as one of many examples, multiple rules to re-use the same action definition.

Rules may be designed to contain conditions. A condition part of a rule is designed to be very flexible. A condition may consist of the evaluation of multiple resources and/or capabilities. A basic condition may be defined as a condition that takes only one resource or capability into account. Therefore, the condition part of a rule may consist of the evaluation of multiple basic conditions combined by logical operators. As one example, syntax for obtaining a measurement of a device using the definitions of a resource and/or capability may be:
[Resource]Capability
and an example:
[MultiSensorA]Temperature Based on the definition above, an example of how a condition can be composed of multiple basic conditions is as follows and illustrated in FIG. 9.
Condition: [MultiSensorA]Temp>25_C AND [DoorSensorB]isOpen==True
BasicCondition1: [MultiSensorA]Temp>25_C
BasicCondition2: [DoorSensorB]isOpen==True Examples of the logical operators that may be used are AND and/or OR. Examples of the comparators that may be used are: =; <;_;_;< >;>.

Various types of basic conditions are defined that allow expansive evaluation of resources and/or capabilities. These include, but are not limited to:
Resource Capability: ( )
This condition may be used when the current measurement of a specific resource and capability is of interest. An example syntax is: [MultiSensorA]Temp>25_C This allows evaluating when a capability has reached a certain threshold (<;_;_;>) or is equal/not equal to a specific value (=;< >).
Resource:
This condition allows specifying the "Resource is connected" event as a condition. An example syntax is: @exist [MultiSensorA]=True
ResourceCapabilityChange:
A need may extend beyond evaluation of only the current value of a measurement. A change in state and/or value of a capability may be of interest. This condition allows defining a change in a capability value. An example syntax is: @change[DoorSensor]DoorState=True This type of evaluation may be beneficial for capabilities that may indicate state, such as a measurement corresponding to whether a window is open or closed.
ResourceCapabilityIncr: The evaluation of condition ResourceCapabilityChange: may be further distinguished between an increasing and decreasing condition change. This condition evaluates to true whenever the capability value increases. An example syntax is: @ incr[MultiSensorA]Temperature=True
Resource CapabilityDecr: Similar to the condition ResourceCapabilityIncr: this condition may be utilized when a capability value decreases. An example syntax is: @decr[MultiSensorA]Temperature=True An ability to combine a very large number of conditions via the logical operators AND and/or OR allows the user and/or system to specify beneficial conditions related to specific requirements. As the semantic search engine in context based and does not need to know the name of the resource and capability, any interest may be expressed by location, device type, protocol, and/or physical measurement capability. A semantic search engine will return corresponding resources matching these interests in a contextual manner.

Rules may have associated actions. Regarding the action part of the rule, a design may be chosen to give the user and/or system as much freedom as possible in terms of the type of action that can be performed. Example action may include, but are not limited to, controlling devices, sending alarms and/or defining new rules. One method of achieving allowing a user and/or system to describe the action part as a custom function or a predefined function is envisioned.

Figure 10:
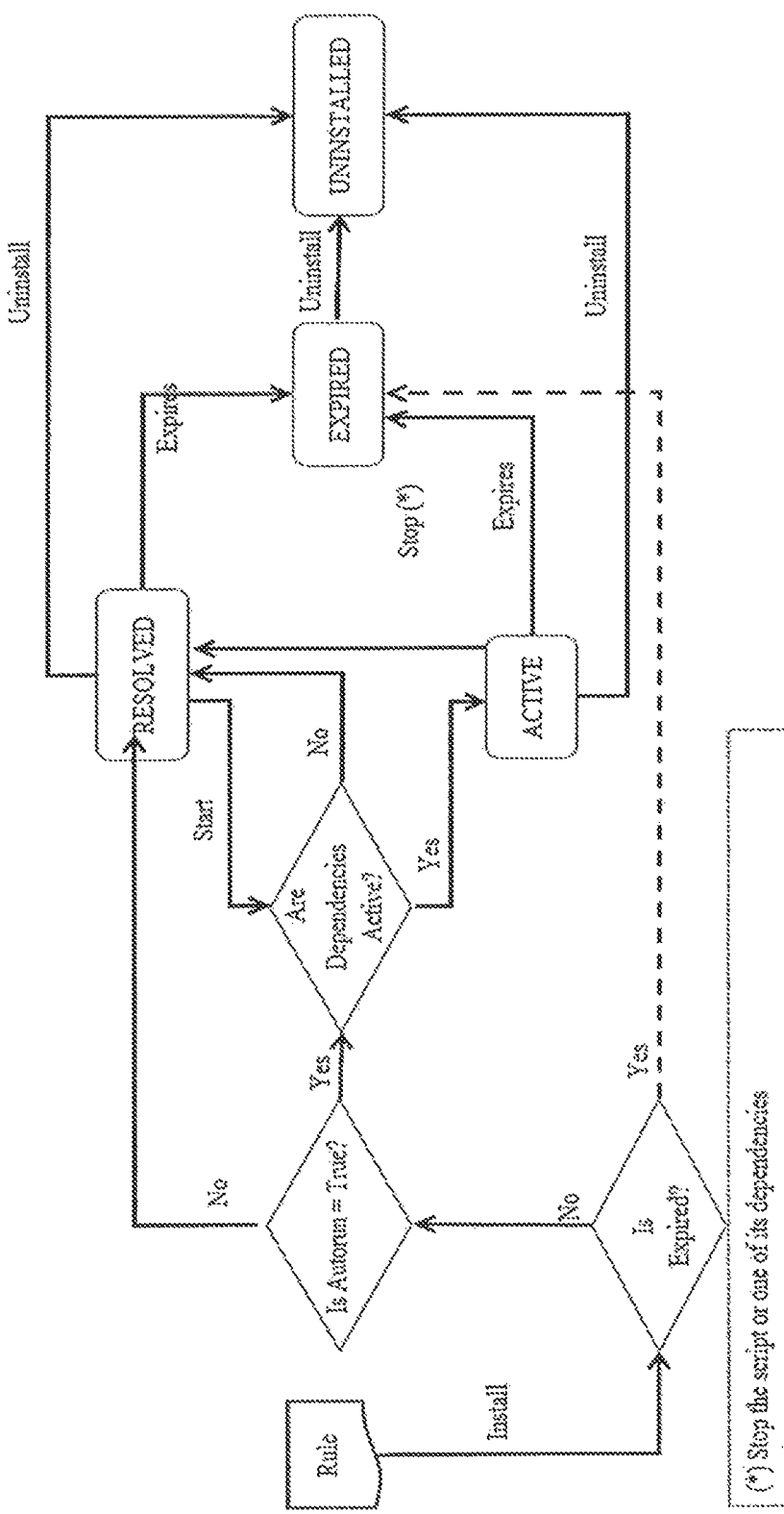
FIG. 10 illustrates embodiments of life cycles of a semantic rule within a semantic search and/or rules engine development and/or execution.

FIG. 10 illustrates embodiments of life cycles of a semantic rule within a semantic rules engine method in accordance with various embodiments of this disclosure. One benefit of the rules is to be as flexible as possible in terms of their life cycle. As one of many examples, a rule that lowers the temperature of a hot water supply might only be activated over weekends and stopped afterwards. Embodiments of a rule a lifecycle allow a user and/or system to fulfil requirements by managing the life-cycle states using Human to Machine Interfaces (HMI) such as a graphical user interface.

It should be appreciated that rules may interact with each other. Rule cooperation where the action part of a rule will be contained within a function. The action may for example may send an alarm with a certain string to a monitoring program or management platform. To specify a separate action for each rule that fulfils the same function would be redundant. Allowing cooperation between rules has a benefit of shared functionality reuse. One result may be less rule definition and allows a user and/or system to use existing functions instead of having to create a new function for each instance.

Figure 11:
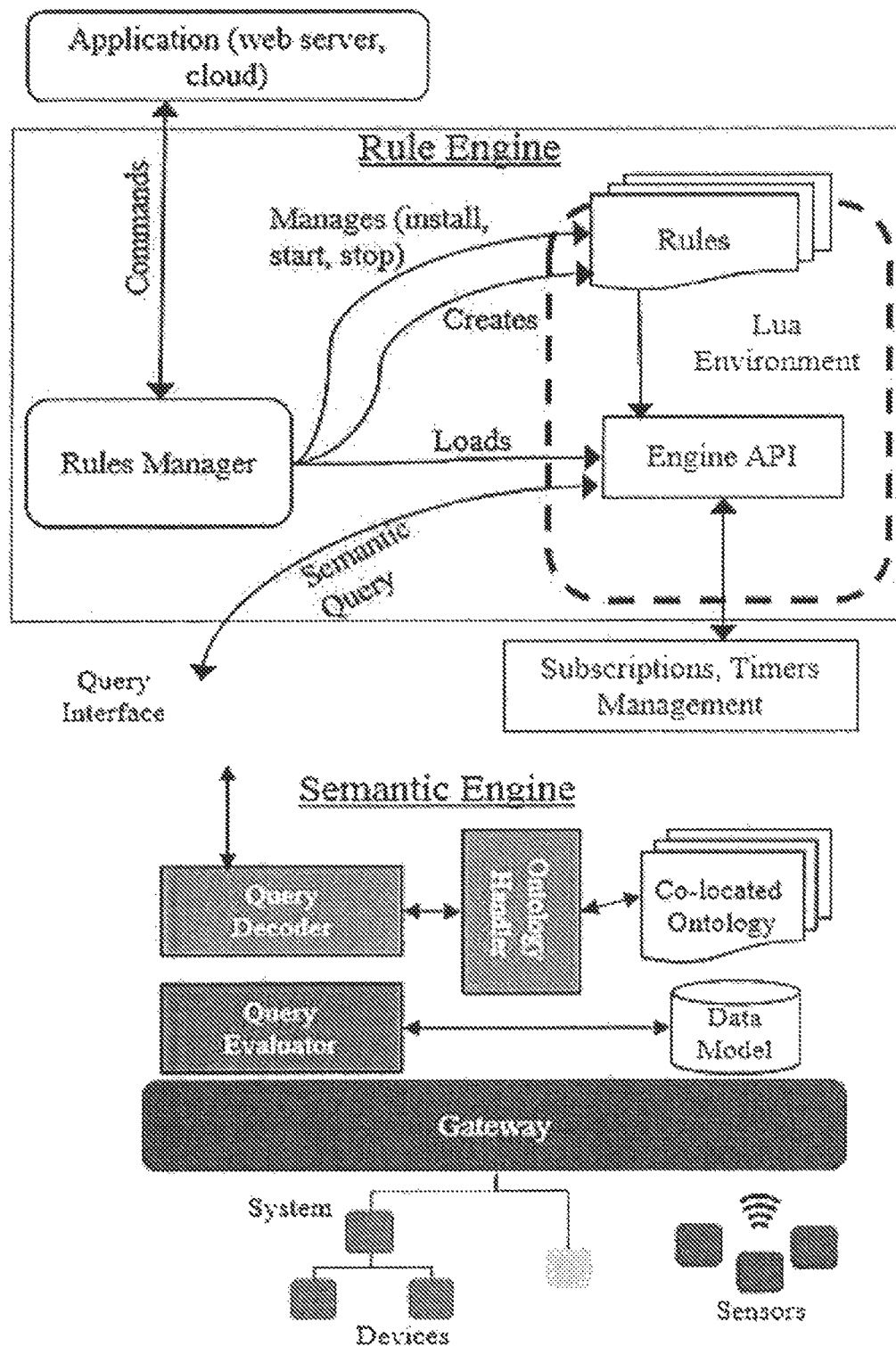
FIG. 11 illustrates aspects of a system for facilitating a semantic search and/or rules engine development and/or execution.

FIG. 11 illustrates aspects of a system for facilitating a semantic search and/or rules engine method in accordance with various embodiments of this disclosure. A rule engine may be implanted with any number of technologies. Examples include, but are not limited to, JESS, JBoss Drools, Lua and/or OpenRules.

In one embodiment, Lua was selected due to the following factors: (1) Lua has been developed for embedded systems; (2) Lua is open source and has a strong user base; (3) Lua syntax may be understood by non-technical users of a system; (4) Lua allows a wide range of expressions; (5) Lua has lightweight open source interpreters in many languages including Java and C thereby facilitating integration within different products.

In this embodiment, a rule may be written as a Lua script which is then executed by the Lua interpreter. Both Java and C versions of rule engine were developed for different hardware platforms offering similar functionality. Supporting functions may include a list of Java or C functions to provide support for subscriptions and timers for execution of rules. An execution environment may be created by the Lua interpreter and ensures that multiple rules do not interfere with each other during their execution.

Lua also allows a rule to call a normal Java or C function whose actual implementation has been done in a Java method or C function. Additional features may be supported by SRE through these implementations and rules can simple call these functions accordingly.

The implementation of Semantic Engine in SRE is also shown in FIG. 11. Similar to the Rule Engine, it may be also developed in both Java and C languages. The rules may be able to send a semantic search query to the query interface of the semantic search engine. Functions may be provided by the Engine API module.

In another embodiment, a Java version of SRE was deployed on a commercial off-the-shelf industrial gateway device which is able to connect to variety of devices and remote cloud platforms using the Modbus1, Ethernet, Wi-Fi and/or GPRS interfaces, among others. A gateway may use Linux OS with IBM J9 as Java Virtual Machine (JVM). J9 is specific for embedded systems and has been certified for industrial usage. ProSyst2 implementation of Open Service Gateway initiative (OSGi) is a framework used over J9 to facilitate modular design of the software components running over ProSyst2. SRE may be implemented as one such component.

In yet another embodiment, the C version of SRE is implemented for a different hardware platform which is based on dual core Cortex A9 chip clocked at 900 Mhz with 1 GB RAM. It should be appreciated other hardware platforms may be used. SRE may also run Linux4 for embedded systems. Connectivity options include, but are not limited to, ZigBee, Ethernet, Bluetooth and/or Wi-Fi. SRE may be developed as a POSIX compliant library that may be imported to other client application projects.

Any general-purpose computer systems used in various embodiments of this disclosure may be, for example, general-purpose computers such as those based on Intel PENTIUM-type processor, Motorola PowerPC, Sun UltraSPARC, Hewlett-Packard PA-RISC processors, or any other type of processor.

Figure 12:
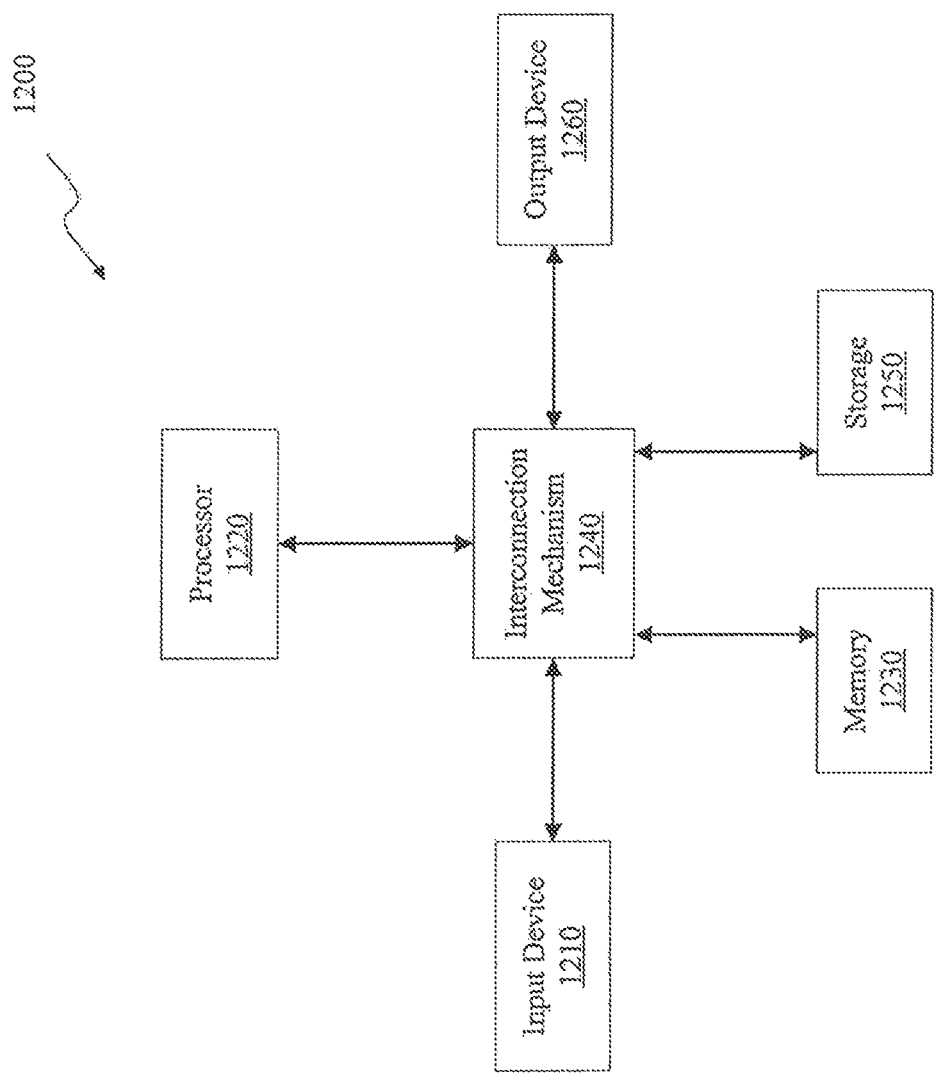
FIG. 12 is a functional block diagram of a general-purpose computer system in accordance with embodiments of this disclosure.

For example, various embodiments of the disclosure may be implemented as specialized software executing in a general-purpose computer system 1200 such as that shown in FIG. 12. The computer system 1200 may include a processor 1220 connected to one or more memory devices 1230, such as a disk drive, memory, or other device for storing data. Memory 1230 is typically used for storing programs and data during operation of the computer system 1200. The computer system 1200 may also include a storage system 1250 that provides additional storage capacity. Components of computer system 1200 may be coupled by an interconnection mechanism 1240, which may include one or more busses (e.g., between components that are integrated within the same machine) and/or a network (e.g., between components that reside on separate discrete machines). The interconnection mechanism 1240 enables communications (e.g., data, instructions) to be exchanged between system components of system 1200.

Computer system 1200 also includes one or more input devices 1210, for example, a keyboard, mouse, trackball, microphone, touch screen, and one or more output devices 1260, for example, a printing device, display screen, speaker. In addition, computer system 1200 may contain one or more interfaces (not shown) that connect computer system 1200 to a communication network (in addition or as an alternative to the interconnection mechanism 1240).

Figure 13:
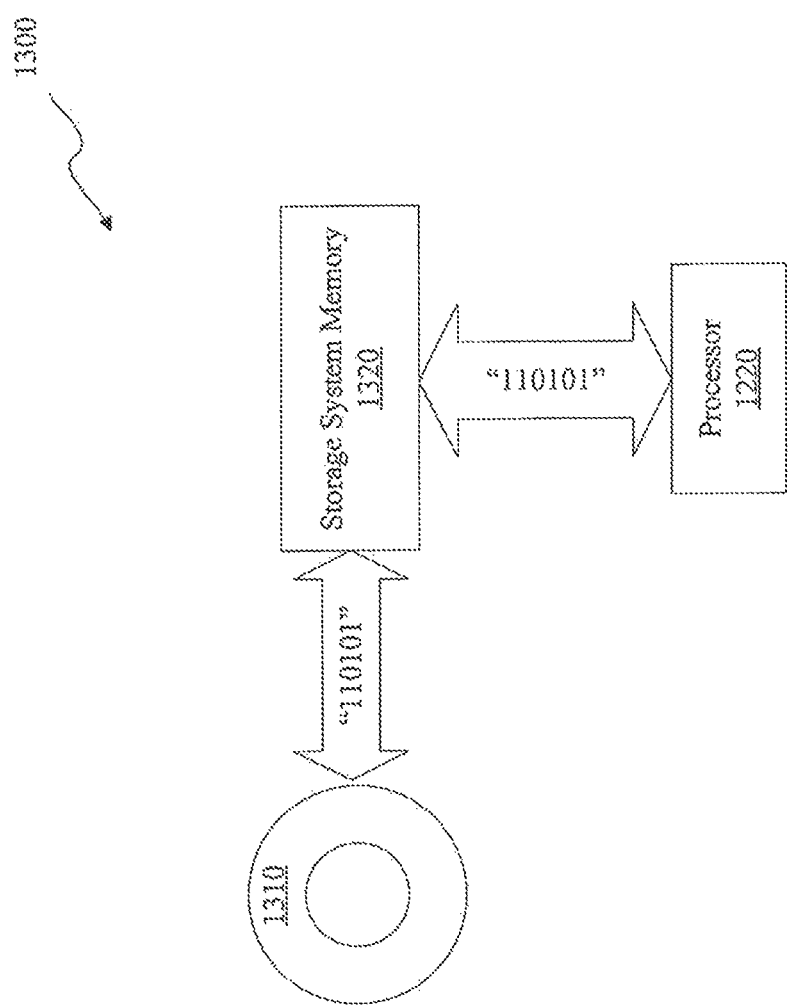
FIG. 13 is a functional block diagram of a general-purpose storage system in accordance with the general-purpose computer system of FIG. 12.

The storage system 1250, shown in greater detail in FIG. 13, typically includes a computer readable and writeable nonvolatile recording medium 1310 in which signals are stored that define a program to be executed by the processor or information stored on or in the medium 1310 to be processed by the program to perform one or more functions associated with embodiments described herein. The medium may, for example, be a disk or flash memory. Typically, in operation, the processor causes data to be read from the nonvolatile recording medium 1310 into another memory 1320 that allows for faster access to the information by the processor than does the medium 1310. This memory 1320 is typically a volatile, random access memory such as a dynamic random access memory (DRAM) or static memory (SRAM). It may be located in storage system 1300, as shown, or in memory system 1230. The processor 1220 generally manipulates the data within the integrated circuit memory 1230, 1320 and then copies the data to the medium 1310 after processing is completed. A variety of mechanisms are known for managing data movement between the medium 1310 and the integrated circuit memory element 1230, 1320, and the disclosure is not limited thereto. The disclosure is not limited to a particular memory system 1230 or storage system 1250.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 1200 is shown by way of example as one type of computer system upon which various aspects of the disclosure may be practiced, it should be appreciated that aspects of the disclosure are not limited to being implemented on the computer system as shown in FIG. 13. Various aspects of the disclosure may be practiced on one or more computers having a different architecture or components shown in FIG. 13. Further, where functions or processes of embodiments of the disclosure are described herein (or in the claims) as being performed on a processor or controller, such description is intended to include systems that use more than one processor or controller to perform the functions.

Computer system 1200 may be a general-purpose computer system that is programmable using a high-level computer programming language. Computer system 1200 may be also implemented using specially programmed, special purpose hardware. In computer system 1200, processor 1220 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

Embodiments of a systems and methods described above are generally described for use in relatively large data centers having numerous equipment racks; however, embodiments of the disclosure may also be used with smaller data centers and with facilities other than data centers. Some embodiments may also be a very small number of computers distributed geographically so as to not resemble a particular architecture.

In embodiments of the present disclosure discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

The invention claimed is:

1. A system for a semantic rules engine, the system including a memory and a processor coupled to the memory and being configured to:
   receive a structured natural language search query and one or more conditions, wherein the structured natural language search query includes an inferential function relating to a particular connected sensing and actuation device;
   deconstruct the received structured natural language search query into one or more composite query elements;
   process the one or more composite query elements with a semantic search engine to identify a plurality of connected sensing and actuation devices, wherein a first connected sensing and actuation device of the plurality of connected sensing and actuation devices is identified as a result of the first connected sensing and actuation device directly corresponding to at least one of the one or more composite query elements, and wherein a second connected sensing and actuation device is identified as a result of an ontology handler processing the inferential function to infer relationships between connected elements included in the structured natural language search query in view of one or more ontologies and determining that an inferred relationship exists between the second connected sensing and actuation device and the particular connected sensing and actuation device, wherein the semantic search engine is configured to use one or more ontology handlers for one or more ontologies to access available inferential references when identifying the set of connected sensing and actuation devices;
   receive a plurality of associated data structures which define one or more characteristics of the corresponding plurality of connected sensing and actuation devices;
   identify one or more business rules that are actively running within an execution environment of a business rules manager module, wherein the business rules manager module is configured to perform operations which include at least one of installing, starting, stopping, and deleting business rules within the execution environment, wherein the one or more business rules are configured with a particular grammar and further configured to express system requirements based on the received structured natural language search query, the plurality of associated data structures, and the one or more conditions;
   evaluate the one or more conditions based on the plurality of associated data structures and the one or more business rules to determine one or more actions for the plurality of connected sensing and actuation devices; and
   execute the one or more actions at the determined plurality of connected sensing and actuation devices.

2. The system of claim 1, wherein the particular grammar includes elements that facilitate filtering, aggregation, resources, capability, or inferential functions determined by ontological operations.

3. The system of claim 1, wherein the one or more business rules are filtered for a data field associated with one or more connected sensing and actuation devices.

4. The system of claim 3, wherein the associated filtered data fields selected from a group including device type, class, capability, or communication protocol.

5. The system of claim 1, wherein the one or more business rules are aggregated to reuse one or more of the determined actions.

6. The system of claim 1, wherein the one or more business rules are deployed locally or remotely by one or more of the plurality of connected sensing and actuation devices.

7. The system of claim 1, wherein the one or more business rules include elements that facilitate installation, activation, deactivation, or uninstallation.

8. The system of claim 1, further comprising updating the one or more business rules associated with a connected device.

9. The system of claim 1, wherein one or more connected sensing and actuation devices are virtual devices.

10. A method for processing a semantic rules engine, comprising:

receiving a structured natural language search query and one or more conditions, wherein the structured natural language search query includes an inferential function relating to a particular connected sensing and actuation device;

deconstructing the received natural language structured search query into one or more composite query elements;

processing one or more composite query elements with a semantic search engine to identify a plurality of connected sensing and actuation, wherein a first connected sensing and actuation device of the plurality of connected sensing and actuation devices is identified as a result of the first connected sensing and actuation device directly corresponding to at least one of the one or more composite query elements, and wherein a second connected sensing and actuation device is identified as a result of an ontology handler processing the inferential function to infer relationships between connected elements included in the structured natural language search query in view of one or more ontologies and determining that an inferred relationship exists between the second connected sensing and actuation device and the particular connected sensing and actuation device, wherein the semantic search engine is configured to use one or more ontology handlers for one or more ontologies to access available inferential references when identifying the set of connected sensing and actuation devices;

receive a plurality of associated data structures which define one or more characteristics of the corresponding plurality of connected sensing and actuation devices;

identifying one or more business rules that are actively running within an execution environment of a business rules manager module, wherein the business rules manager module is configured to perform operations which include at least one of installing, starting, stopping, and deleting business rules within the execution environment, wherein the one or more business rules are configured with a particular grammar and is configured to express system requirements based on the received structured natural language search query, the plurality of associated data structures, and the one or more conditions;

evaluating the one or more conditions based on the plurality of associated data structures and the one or more business rules to determine one or more actions for the plurality of connected sensing and actuation devices; and executing the one or more actions at the determined plurality of connected sensing and actuation devices.

11. The method of claim 10, wherein the particular grammar includes elements that facilitate filtering, aggregation, resources, capability, or inferential functions determined by ontological operations.

12. The method of claim 10, wherein the one or more business rules are filtered for a data field associated with one or more connected sensing and actuation devices.

13. The method of claim 12, wherein the associated filtered data fields selected from a group including device type, class, capability, or communication protocol.

14. The method of claim 10, wherein the one or more business rules are aggregated to reuse one or more of the determined actions.

15. The method of claim 10, wherein the one or more business rules are deployed locally or remotely by one or more of the plurality of connected sensing and actuation devices.

16. The method of claim 10, wherein the one or more business rules include elements that facilitate installation, activation, deactivation, or uninstallation.

17. The method of claim 10, further comprising updating the one or more business rules associated with a connected device.

18. The method of claim 10, wherein one or more connected sensing and actuation devices are virtual devices.

19. A non-transitory computer-readable medium containing computer program code that, when executed by operation of one or more computer processors, performs an operation for processing a semantic rules engine, the operation comprising:

receiving a structured natural language search query and one or more conditions, wherein the structured natural language search query includes an inferential function relating to a particular connected sensing and actuation device;

deconstructing the received structured natural language search query into one or more composite query elements;

processing one or more composite query elements with a semantic search engine to identify a plurality of connected sensing and actuation devices, wherein a first connected sensing and actuation device of the plurality of connected sensing and actuation devices is identified as a result of the first connected sensing and actuation device directly corresponding to at least one of the one or more composite query elements, and wherein a second connected sensing and actuation device is identified as a result of an ontology handler processing the inferential function to infer relationships between connected elements included in the structured natural language search query in view of one or more ontologies and determining that an inferred relationship exists between the second connected sensing and actuation device and the particular connected sensing and actuation device, wherein the semantic search engine is configured to use one or more ontology handlers for one or more ontologies to access available inferential references when identifying the set of connected sensing and actuation devices;

receive a plurality of associated data structures which define one or more characteristics of the corresponding plurality of connected sensing and actuation devices;

identifying one or more business rules that are actively running within an execution environment of a business rules manager module, wherein the business rules manager module is configured to perform operations which include at least one of installing, starting, stopping, and deleting business rules within the execution environment, wherein the one or more business rules are configured with a particular grammar and is configured to express system requirements based on the received structured natural language search query, the plurality of associated data structures, and the one or more conditions;

evaluating, the one or more conditions based on the plurality of associated data structures and the one or more business rules to determine one or more actions for the plurality of connected sensing and actuation devices; and executing, the one or more actions at the determined plurality of connected sensing and actuation devices.

20. The system of claim 1, wherein the one or more business rules are deployed from the determined plurality of connected sensing and actuation devices.

21. The system of claim 1, further comprising an associated business rule life cycle wherein the business rule lifecycle is configured to perform operations which include at least one of installation, activation, deactivation, and uninstallation of the one or more business rules.

22. The method of claim 10, wherein deploying the one or more business rules is configured from the determined plurality of connected sensing and actuation devices.

23. The method of claim 10, further comprising associating a lifecycle to one or more business rules cycle wherein the business rule lifecycle is configured to perform operations which include at least one of installation, activation, deactivation, and uninstallation of the one or more business rules.

24. The non-transitory computer-readable medium of claim 19, wherein deploying the one or more business rules is configured from the determined plurality of connected sensing and actuation devices.

25. The non-transitory computer-readable medium of claim 19, further comprising associating a lifecycle to one or more business rules cycle wherein the business rule lifecycle is configured to perform operations which include at least one of installation, activation, deactivation, and uninstallation of the one or more business rules.

\* \* \* \* \*